(12) United States Patent
Oto

(10) Patent No.: US 8,477,272 B2
(45) Date of Patent: Jul. 2, 2013

(54) QUARTER WAVE PLATE, OPTICAL PICKUP DEVICE, AND REFLECTIVE LIQUID CRYSTAL DISPLAY DEVICE

(75) Inventor: Masayuki Oto, Zama (JP)

(73) Assignee: Seiko Epson Corporation (JP)

( * ) Notice: Subject to any disclaimer, the term of this patent is extended or adjusted under 35 U.S.C. 154(b) by 923 days.

(21) Appl. No.: 12/603,992

(22) Filed: Oct. 22, 2009

(65) Prior Publication Data

US 2010/0103084 A1    Apr. 29, 2010

(30) Foreign Application Priority Data

Oct. 27, 2008 (JP) ................. 2008-276180
Jul. 24, 2009 (JP) ................. 2009-173236

(51) Int. Cl.
*G02F 1/1335* (2006.01)

(52) U.S. Cl.
USPC .......................................................... 349/117

(58) Field of Classification Search
USPC .......................................................... 349/117
See application file for complete search history.

(56) References Cited

U.S. PATENT DOCUMENTS

2007/0127130 A1    6/2007    Ushino et al.

FOREIGN PATENT DOCUMENTS

| JP | 52-4948 | 2/1977 |
|---|---|---|
| JP | 63-43721 | 9/1988 |
| JP | 3-58081 | 9/1991 |
| JP | 3-61921 | 9/1991 |
| JP | 2005-015121 | 1/2005 |
| JP | 2005-158121 | 6/2005 |
| JP | 2005-208588 | 8/2005 |
| JP | 2006-40343 | 2/2006 |
| JP | 2006-40359 | 2/2006 |

*Primary Examiner* — Phu Vu
(74) *Attorney, Agent, or Firm* — Harness, Dickey & Pierce, P.L.C.

(57) ABSTRACT

A quarter wave plate that is a crystal plate made of an inorganic material having birefringence and optical rotatory power and has an optical axis, includes an incident surface positioned on one surface of the crystal plate; and an emitting surface positioned on another surface, which is opposed to the incident surface, of the crystal plate. In the quarter wave plate, linearly-polarized light incident from the incident surface is converted into circularly-polarized light so as to be emitted from the emitting surface, and circularly-polarized light incident from the incident surface is converted into linearly-polarized light so as to be emitted from the emitting surface. Further, in the wave plate, an angle $\phi$ formed by a normal line on the incident surface and the optical axis is set in a range of $0°<\phi<90°$, and an optical axis azimuth angle $\theta$ formed by an optical axis projection line, which is formed by projecting the optical axis on the incident surface, and a polarization plane of the linearly-polarized light is set in one of a range of $0°<\theta<90°$ under $\theta \neq 45°$ and a range of $90°<\theta<180°$ under $\theta \neq 135°$.

10 Claims, 31 Drawing Sheets

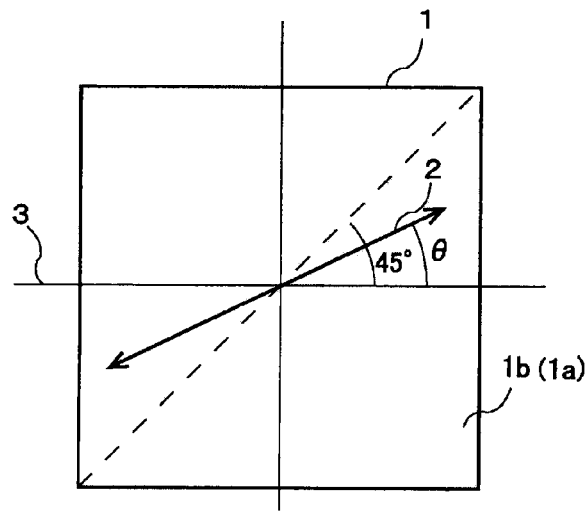
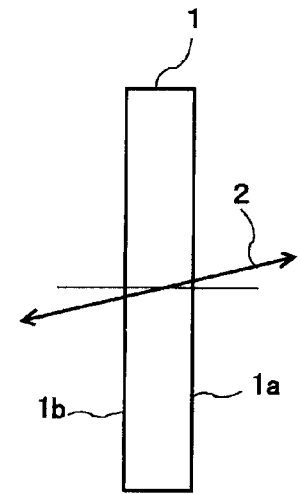
FIG. 16-1A  FIG. 16-1B
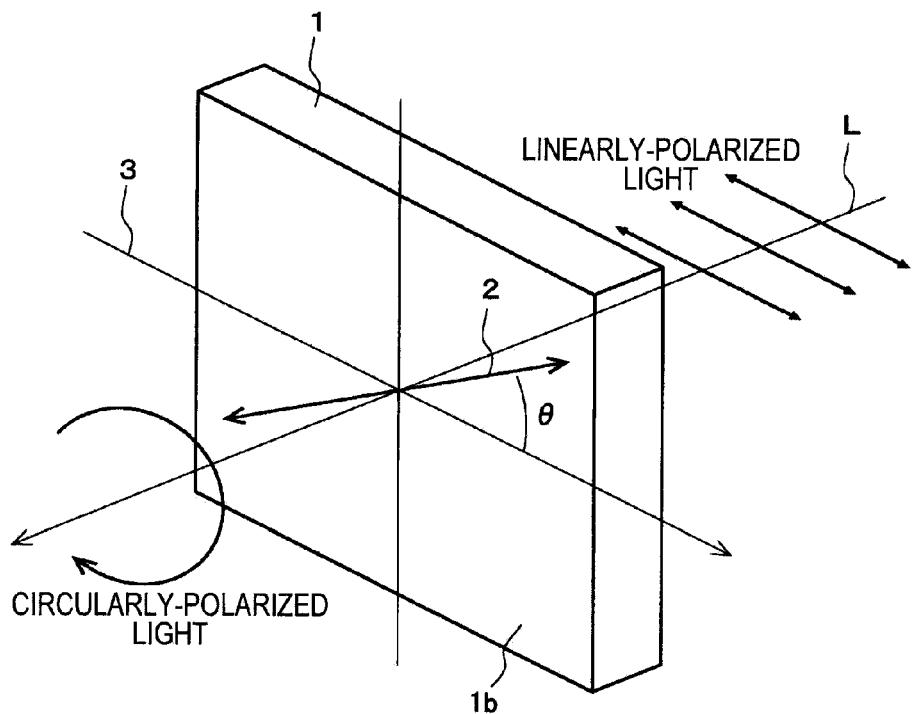
FIG. 16-1C

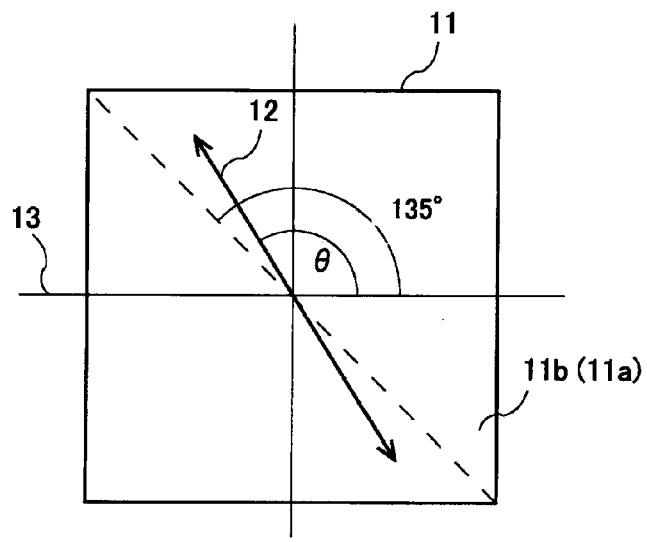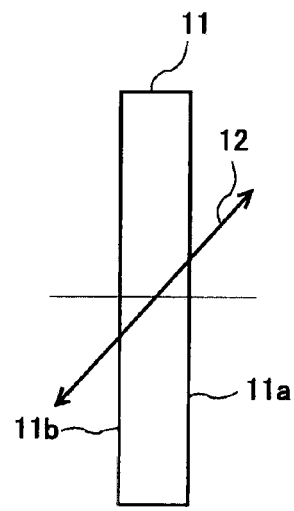
FIG. 18-1A  FIG. 18-1B
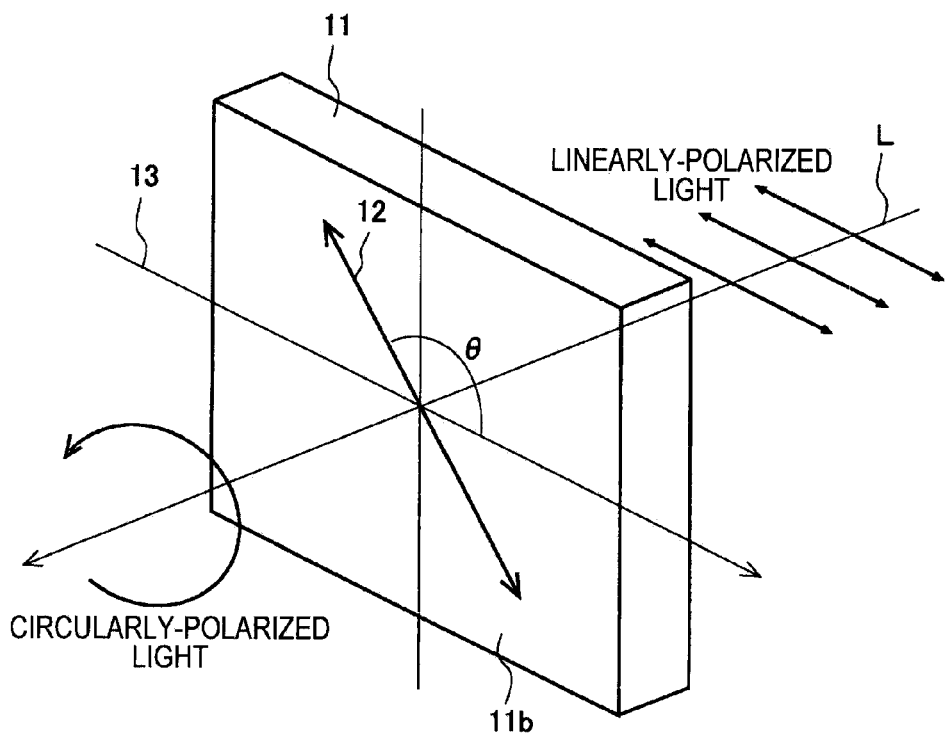
FIG. 18-1C

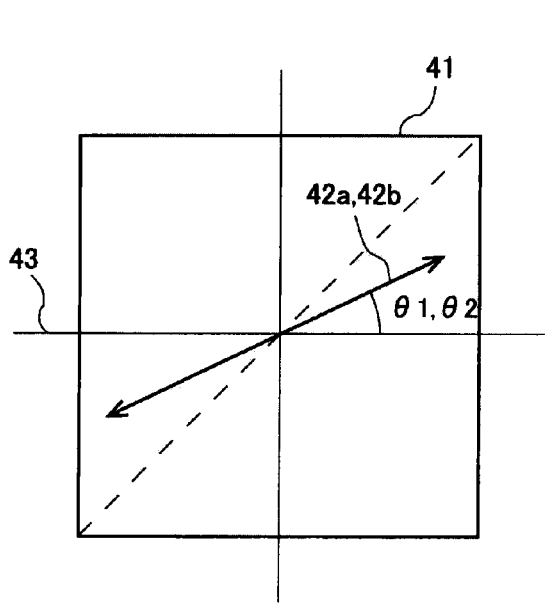
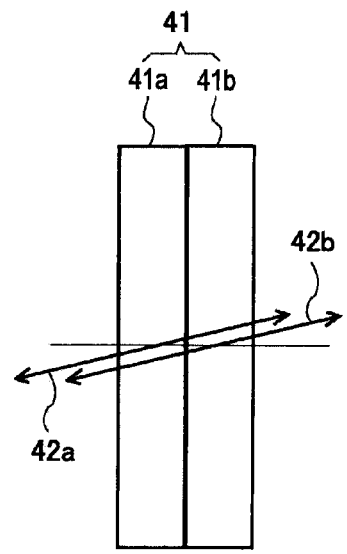
FIG.21A  FIG.21B
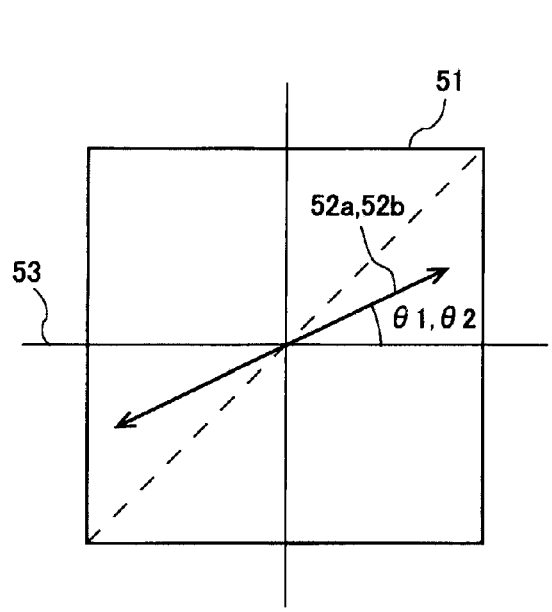
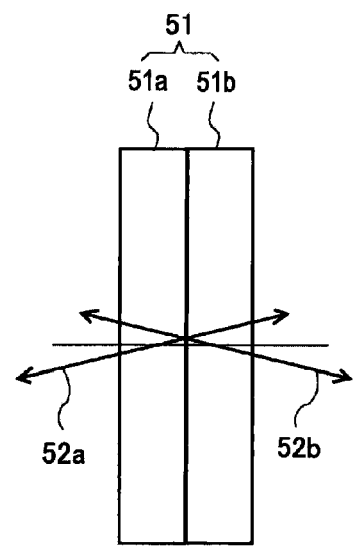
FIG.22A  FIG.22B

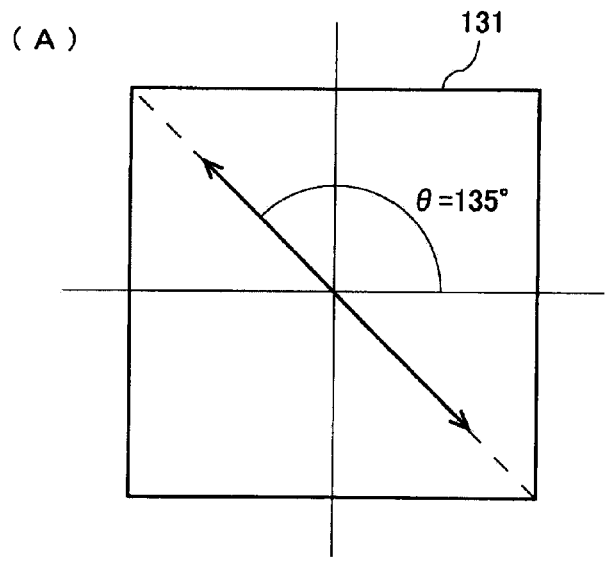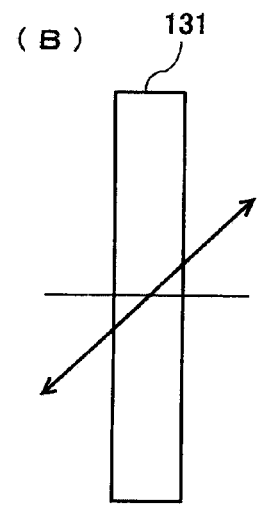
FIG.28A   FIG.28B
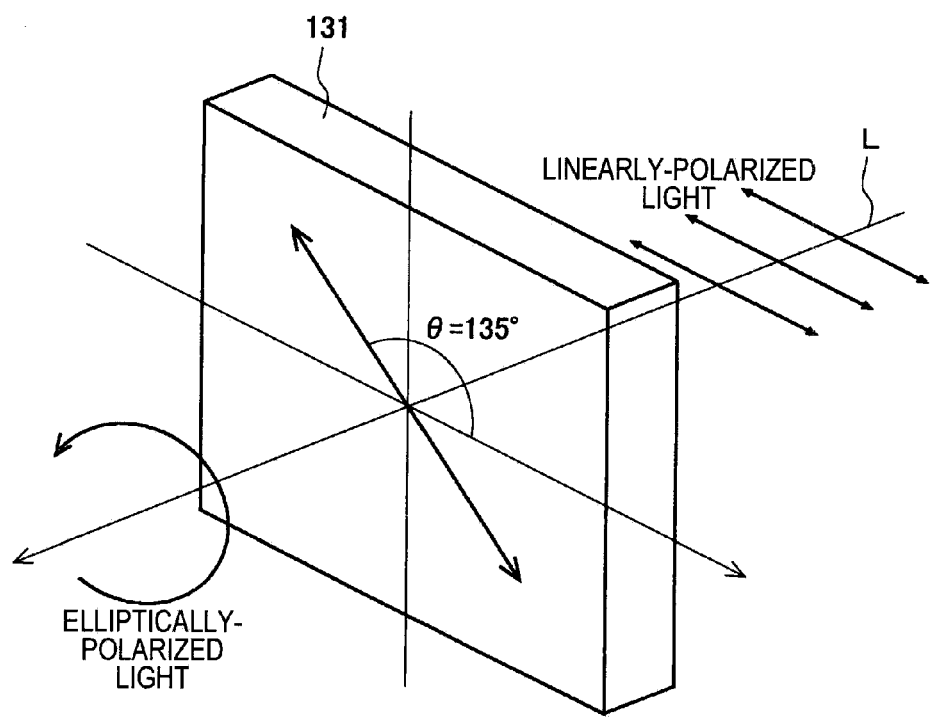
FIG.28C

QUARTER WAVE PLATE, OPTICAL PICKUP DEVICE, AND REFLECTIVE LIQUID CRYSTAL DISPLAY DEVICE

BACKGROUND

1. Technical Field

The present invention relates to a quarter wave plate used in optical devices such as an optical pickup device and a liquid crystal projector, or used in optical parts such as an optical lowpass filter. Especially, the present invention relates to a quarter wave plate made of an inorganic crystal material such as quartz crystal having birefringence and optical rotatory power. The present invention further relates to an optical pickup device and a reflective liquid crystal display device including the quarter wave plate.

2. Related Art

A phase plate having a quarter wavelength and converting a polarization state between linearly-polarized light and circularly-polarized light, namely, a quarter wave plate has been applied to various optical uses. As disclosed in JP-A-2005-208588, JP-A-2006-40343, JP-B-52-4948, and JP-B-3-58081 as first to fourth examples of related art, a quarter wave plate is commonly composed of a resin film which is made of an organic material such as polycarbonate and has obtained birefringence through a stretching treatment; a phase difference plate obtained by sandwiching a polymer liquid crystal layer by transparent substrates; or a crystal plate made of an inorganic crystal material such as quartz crystal having birefringence.

In recent years, in optical pickup devices used for recording and reproducing of an optical disk device, blue-violet laser having a very short wavelength and outputted in high-power is used so as to achieve high-density and large-amount recording. However, the resin film and the liquid crystal material described above have a property easily absorbing light in an ultraviolet region from blue. Therefore, the film and the material may emit heat by absorbing blue-violet laser light so as to deteriorate the material itself, disadvantageously deteriorating a function of the wave plate. In contrast, the inorganic crystal material such as quartz crystal has remarkably high light resistance, so that a quartz crystal wave plate is especially suitable for an optical system using blue-violet laser.

Quartz crystal wave plates having various structures have been developed. For example, a crystal plate of the third example is capable of highly-accurate conversion between linearly-polarized light and circularly-polarized light. The highly-accurate conversion is achieved by obtaining ellipticity k of main elliptically-polarized light and calculating thickness d of the crystal plate by the following formula when an optical axis of the plate is tilted from a normal line of an incident surface thereof.

$$\cos\{(2\pi/\lambda)\times\Delta n\cdot d\} = -\{2k/(1-k^2)\}^2$$

Here, λ denotes a wavelength of light incident on the crystal plate, and Δn denotes difference of a refractive index for the main elliptically-polarized light.

Commonly, in an optical pickup device, a laser beam from a semiconductor laser is converted from linearly-polarized light to circularly-polarized light by a quarter wave plate, and the light is reflected by a surface of an optical disk, then converted back to the linearly-polarized light by the quarter wave plate, and converted into an electrical signal at a light receiving device. However, the laser light is diverging light, so that a component, which is not converted into perfect circularly-polarized light but into elliptically-polarized light due to incident angle dependency thereof when the laser light passes through the quarter wave plate, is reflected by the surface of the optical disk to return to the semiconductor laser, disadvantageously causing unstable lasing. The fourth example discloses a quartz crystal plate which improves the problem of the incident angle dependency. The problem is improved in such a way that a refracting direction of extraordinary ray, which is determined by an incident angle of light, is set to agree with a crystal axis other than an optical axis and also set to be orthogonal to the optical axis so as to minimize an amount of change of phase difference between ordinary ray and extraordinary ray due to change of the incident angle. Accordingly, incident linearly-polarized light can be nearly-perfectly converted into circularly-polarized light constantly to be emitted.

JP-B-3-61921 as a fifth example discloses a phase plate as follows. The phase plate is formed by bonding two crystal plates to each other in a manner that optical axes of the plates are symmetrical to their bonding surface and are parallel to each other when viewed from a normal line direction of a plate surface, being able to cancel change of retardation caused by change of a beam incident angle. Further, JP-A-2006-40359 as a sixth example discloses a laminated quarter wave plate formed by bonding a first wave plate and a second wave plate. The laminated quarter wave plate exhibits a desired function as a quarter wave plate even when the first and second wave plates are arranged to be slightly tilted from an optical path because the plates are laminated in a manner to mismatch their optical axes for compensating disagreement of their optical axes caused by the tilted arrangement.

It is well-known that optical rotatory power of quartz crystal can influence capability of a quartz crystal wave plate. To solve such problem, JP-A-2005-158121 as a seventh example discloses a quarter wave plate which is less influenced by the optical rotatory power so as to improve properties thereof in a broad bandwidth. The quarter wave plate is formed by laminating two wave plates made of an optical material having optical rotatory power in a manner to make their optical axes orthogonal to each other and has such a structure that phase difference, an optical axis azimuth angle, optical rotatory power, and an angle, which is formed by a rotation axis and a neutral axis, of the wave plates that are obtained by an approximate formula using Poincare sphere satisfy a predetermined relational expression.

The quarter wave plate of the seventh example is described with reference to FIG. 26 showing a Poincare sphere same as that shown in FIG. 1 of JP-A-2005-158121. FIG. 26 illustrates an operation when light having a wavelength λ travels in quartz crystal. When a light incident direction is set to be a neutral axis S1 passing through two points Cf and Cs on the equator, phase difference Γ due to linear birefringence is given in a direction of the neutral axis S1, and phase difference 2ρ due to circular birefringence is given in a polar axis direction LR passing through the north pole and the south pole, a composite vector Γ' is considered. When two points intersecting with the Poincare sphere on an extending direction of the composite vector Γ' are set to be Pa and P, an angle β formed by a line PaP and a plane always including the neutral axis S1 and a neutral axis S2 which is orthogonal to the neutral axis S1 is expressed by the following formula.

$$\tan\beta = 2\rho/\Gamma$$

Accordingly, the composite vector Γ' is expressed as the following formula.

$$\Gamma' = \sqrt{\Gamma^2 + (2\rho)^2} \qquad \text{Formula 3}$$

Here, Γ and ρ satisfy the following relation when extraordinary ray refractive index is denoted as $n_e'$, ordinary ray refractive index is denoted as $n_o$, right circularly-polarized light refractive index is denoted as $n_R$, left circularly-polarized light refractive index is denoted as $n_L$, and crystal thickness is denoted as d.

Γ: phase difference due to linear birefringence        Formula 4

$$\Gamma = \frac{2\pi}{\lambda}(n_e' - n_o)d$$

2ρ: phase difference due to linear birefringence $$2\rho = \frac{2\pi}{\lambda}(n_R - n_L)d$$

Thus, the composite vector Γ' is obtained by composing phase difference due to linear birefringence and phase difference due to circular birefringence, and can be handled as behavior rotating by a vector Γ' on the Poincare sphere by using the line PaP as a rotating axis.

In the seventh example, in order to effectively simulate a phase difference characteristic in the quartz crystal wave plate having optical rotatory power, the quartz crystal wave plate is divided into n number of rotators Ti (i=1 or more) and n number of phase shifters Ri (i=1 or more) in a thickness direction. Thereby, a function W of the quartz crystal wave plate approximates as the following formula by using a determinant in which the azimuth rotators Ti and the phase shifters Ri function alternately.

$$W = T_n R_n \ldots T_3 R_3 T_2 R_2 T_1 R_1$$        Formula 5

$$W = \prod_{k=1}^{n} T_k R_k$$

Especially, a quarter wave plate used in an optical pickup device of a high recording-density optical disk device is required to have high linearly-circularly polarized light conversion efficiency of ellipticity of 0.9 or more. However, the quartz crystal wave plates, described above, of the related art are designed without considering a direct influence on ellipticity and phase difference due to change of a polarization state of the wave plate caused by optical rotatory power of quartz crystal. Therefore, the influence of the optical rotatory power can not be totally excluded, so that it is difficult to make the ellipticity of the quarter wave plate have a high value of 0.9 or more or approximately 1.

The inventor inspected how the optical rotatory power influenced on the polarization state and how the change of the polarization state could be excluded in a quarter quartz crystal wave plate. First, ellipticity, phase difference, and thickness t of the wave plate in relation to a cutting angle of a quartz crystal plate were simulated under a wavelength λ of 405 nm, by using a quartz crystal wave plate which was designed by a common method to have an optical axis azimuth angle θ of 45° and design phase difference Γ of 90°. Here, the phase difference is actual phase difference generated between light incident on the wave plate and light emitted from the wave plate. The optical axis azimuth angle is formed by a polarization plane of linearly-polarized light incident on the wave plate and a crystal optical axis projected on an incident surface (or an emitting surface) of the wave plate. The cutting angle of the quartz crystal plate is formed by a normal line on the incident surface of the quartz crystal plate and Z-axis (the optical axis) of the quartz crystal. Here, right-handed quartz crystal was used in this simulation. The phase difference Γ is calculated by a well-known formula below.

$$\Gamma = (360/\lambda) \cdot (n_e - n_o)t$$

$n_o$: ordinary ray refractive index
$n_e$: extraordinary ray refractive index

FIGS. 27A to 27C are diagrams showing a quartz crystal quarter wave plate 121 and FIGS. 28A to 28C are diagrams showing a quartz crystal quarter wave plate 131. The quartz crystal quarter wave plates 121 and 131 are a single plate type which is well known. The wave plate 121 shown in FIGS. 27A and 27B has right-handed optical rotatory power for converting linearly-polarized light of incident light L into right-handed circularly-polarized light and an optical axis azimuth angle θ of 45°. The phase difference of 90° and rotation of a polarization plane due to the optical rotatory power act on the linearly-polarized light incident on the wave plate because of the birefringence of quartz crystal, so that the light is not emitted from an emitting surface as circularly-polarized light but emitted as right-handed elliptically polarized light as shown in FIG. 27C. The wave plate 131 shown in FIGS. 28A and 28B has left-handed optical rotatory power for converting linearly-polarized light of incident light L into left-handed circularly-polarized light and an optical axis azimuth angle θ of 135°. The phase difference of 90° and rotation of a polarization plane due to the optical rotatory power act on the linearly-polarized light incident on the wave plate because of the birefringence of quartz crystal likewise the above case, so that the light is not emitted from the emitting surface as circularly-polarized light but emitted as left-handed elliptically-polarized light as shown in FIG. 28C. The wave plate used in the present simulation had the structure shown in FIGS. 27A and 27B.

The results are shown in FIGS. 29A to 29C. Referring to FIGS. 29A and 29B, as the cutting angle ϕ of the quartz crystal plate is increased, the ellipticity approaches 1 and the phase difference is maintained at 90°. Thus an influence of the optical rotatory power is small. On the other hand, when the cutting angle ϕ is small such as in a range approximately from 5° to 20°, the ellipticity is less than 0.9, and the phase difference can not be maintained at 90°. As is apparent from FIG. 29C, when the cutting angle ϕ is in a range approximately from 30° to 90°, the thickness of the quartz crystal plate is thin such as approximately from 10 μm to 26 μm. Therefore, the strength of the quartz crystal plate is remarkably degraded, so that the quartz crystal plate is fragile and easily broken. Accordingly, it is difficult to handle the quartz crystal plate on manufacturing and on practical use.

In order to avoid the difficulty of the manufacturing of the crystal plate, the quartz crystal plate needs to have the thickness of at least approximately 80 μm. The cutting angle of the quartz crystal plate was set to be 10°, and wavelength dependency of phase difference and that of ellipticity were simulated. FIG. 30 is a graph showing a case where a quartz crystal plate is designed by a common designing method to have an optical axis azimuth angle θ of 45° and design phase difference $\Gamma_o$ of 90°. The graph shows ellipticity by a solid line and phase difference by a dashed line. As shown in FIG. 30, the ellipticity was approximately 0.46 and the phase difference was 102.2° under the wavelength λ of 405 nm.

This is described with reference to a Poincare sphere of FIG. 31. In a case of FIG. 30, a reference point $P_o$ of incident light is set to as $P_o=(1, 0, 0)$, and a rotation axis $R_o$ is set by being rotated by 2θ=90° from an S1 axis (positioned on an S2 axis) and then being tilted by an angle of 2ρ (ρ is an optical rotatory angle of the quartz crystal plate) with respect to an S1-S2 plane in a north pole (S3) direction. When the reference point $P_o$ is rotated clockwise by phase difference $\delta=90°$ around the rotation axis $R_o$, a point $P_1$ on the sphere is an actual position of emitted light. Thus, elliptically-polarized light is emitted from a position largely apart from the north pole from which circularly-polarized light is emitted, thereby being unsuitable for an optical system such as an optical pickup device which demands high ellipticity.

SUMMARY

An advantage of the present invention is to provide a quarter wave plate having an excellent optical characteristic. The quarter wave plate is a crystal plate made of an inorganic material such as quartz crystal. The inorganic material has birefringence and optical rotatory power, and exhibits sufficient light resistance to blue-violet laser having a short wavelength and outputted in high power, and sufficient reliability. In the quarter wave plate, ellipticity can be made optimum to have a high value of 0.9 or more or approximately 1.

Another advantage of the present invention is to achieve an optical pickup device which includes the quarter wave plate having the excellent optical characteristic so as to be suitable for an optical disk device of higher recording density, and a reflective liquid crystal display device which includes the quarter wave plate so that contrast thereof is improved compared to related art.

The inventor further simulated a relation between an optical axis azimuth angle and ellipticity about the quartz crystal plate described above in relation to FIGS. 27A to 27C. The result thereof is shown in FIG. 1. As shown in FIG. 1, it is understood that suitable ellipticity which is at the maximum value and is more than 0.9 is obtained at the optical axis azimuth angle θ of around 35°.

A quartz crystal plate of which a cutting angle φ is 10° and a design phase difference $\Gamma_o$ is 90° under the optical axis azimuth angle θ of 35° was designed and then wavelength dependency of phase difference and that of ellipticity were simulated. The result is shown in FIG. 2 in which the ellipticity is expressed by a solid line and the phase difference is expressed by a dashed line. In light of an error and yield on manufacturing, it is preferable to further bring the ellipticity close to 1.

Therefore, a relation between the design phase difference $\Gamma_o$ and the optical axis azimuth angle θ was examined. Change of ellipticity corresponding to design phase difference was simulated under cases where the optical axis azimuth angle θ was 33°, 33.5°, 34°, 34.5°, and 35°, and the result of the simulation is shown in FIG. 3. The ellipticity could be improved up to about 0.99 under the design phase difference of around 91.5° and the optical axis azimuth angle of around 34°. As shown in FIG. 3, it was proved that the ellipticity can be improved by changing the optical axis azimuth angle and the design phase difference bilaterally.

The wavelength dependency of the phase difference and that of the ellipticity are shown in FIG. 4 in which the ellipticity is expressed by a solid line and the phase difference is expressed by a dashed line. FIG. 4 exhibits that ellipticity high enough can be secured at the wavelength of approximately 405 nm even when an error and yield on manufacturing are considered.

This is described with reference to a Poincare sphere of FIG. 5. FIGS. 6A and 6B show the Poincare sphere of FIG. 5 respectively viewed from an S1 direction (front face) and from an S3 direction (plain face). In the case of FIG. 2, a reference point $P_o$ of incident light L is set as $P_o=(1, 0, 0)$, and a rotation axis $R_1$ is set by being rotated by $2\theta=70°$ from an S1 axis (positioned on an S2 axis) and then being tilted by an angle of 2ρ (ρ is an optical rotatory angle of the quartz crystal plate) with respect to an S1-S2 plane in a north pole (S3) direction. When the reference point $P_0$ is rotated clockwise by phase difference $\delta_1=90°$ around the rotation axis $R_1$, a point $P_{11}$ on the sphere is an actual position of emitted light. Compared to the case of FIG. 30 in which the wavelength λ is 405 nm and the ellipticity is approximately 0.46, the position of the emitted light is closer to the north pole and the ellipticity is closer to 1.

In the case of FIG. 4, a rotation axis $R_2$ is set at a position where the rotation axis $R_1$ is rotated so as to slightly return toward the S1 axis. When the reference point $P_o$ is rotated clockwise by phase difference $\delta_2=91.5°$ around the rotation axis $R_2$, a point $P_{12}$ on the sphere is an actual position of emitted light. Compared to the case of FIG. 2, the position of the emitted light is further closer to the north pole and the ellipticity is further closer to 1.

From the results of these simulations, it was proved that the ellipticity could be largely improved, compared to the related art, such that the ellipticity had a value extremely close to 1 by adding an amount of change of the polarization state due to the optical rotatory power of quartz crystal as a compensation amount to an amount of change of the phase due to the birefringence of quartz crystal, that is, to the design phase difference and the optical axis azimuth angle.

The inventor further performed a simulation about a cutting angle φ other than 10°. A relation between an optical axis azimuth angle θ and ellipticity was simulated by changing a cutting angle of a quartz crystal plate from 5° to 30° in a stepwise fashion when the design phase difference $\Gamma_o$ was assumed as 90°. The result thereof is shown in FIG. 7. Optimum optical axis azimuth angles at which the ellipticity has a maximum value are shown below for respective cutting angles.

| Cutting angle | Optimum optical axis azimuth angle | Maximum ellipticity |
| --- | --- | --- |
| 5° | 20° | 0.76 |
| 10° | 34° | 0.95 |
| 15° | 40° | 0.99 |
| 20° | 42° | 0.99 |
| 25° | 43° | 0.99 |
| 30° | 44° | 0.98 |

From the result, it is understood that the ellipticity can be improved by changing the optical axis azimuth angle θ from 45° depending on the cutting angle in contrast to a related art quartz crystal quarter wave plate of which the optical axis azimuth angle θ is set to be 45° without considering the cutting angle. However, when the cutting angle φ is small, especially when the cutting angle φ is 5°, the ellipticity is small down to about 0.76. Therefore, it is not preferable that the quartz crystal plate is used as it is in an optical pickup device as a quarter wave plate.

Therefore, further optimization of the optical axis azimuth angle was attempted by changing the design phase difference $\Gamma_o$ from 90° for further improving the optical axis azimuth angle. FIGS. 8A, 9A, 10A, 11A, 12A and 13A show a relation between design phase difference and ellipticity obtained by simulations on optical axis azimuth angles in a predetermined range including the most suitable optical axis azimuth angle of each cutting angle. FIGS. 8B, 9B, 10B, 11B, 12B and 13B show ellipticity with respect to change of each of the optical axis azimuth angles in a predetermined range including the most suitable optical axis azimuth angle of each cutting angle. From results of FIGS. 8A to 13B, it was proved that there was a combination of a range of the optical axis azimuth angle and a range of the design phase difference within which ellipticity of 0.9 could be secured, in each of the cutting angles.

The following table shows the results.

TABLE 1

| Cutting angle | Optimum optical axis azimuth angle | Optical axis compensation amount (a) | Optimum design phase difference | Phase difference compensation amount (b) | Maximum ellipticity |
|---|---|---|---|---|---|
| 5° | 15° | 30° | 102.0° | 12.0° | 0.98 |
| 10° | 34° | 11° | 91.5° | 1.5° | 0.99 |
| 15° | 40° | 5° | 90.5° | 0.5° | 0.99 |
| 20° | 42° | 3° | 90.0° | 0.0° | 0.99 |
| 25° | 43° | 2° | 90.0° | 0.0° | 0.99 |
| 30° | 44° | 1° | 90.0° | 0.0° | 0.99 |

Here, an optical axis compensation amount indicates a compensation amount from the optical axis azimuth angle θ of 45° which is commonly set in a related art quartz crystal quarter wave plate converting linearly-polarized light into circularly-polarized light, that is, a value obtained by deducting the optimum optical axis azimuth angle from 45°. A phase difference compensation amount indicates a compensation amount from the design phase difference $\Gamma_o$ of 90° which is commonly set in a related art quartz crystal quarter wave plate converting linearly-polarized light into circularly-polarized light, that is, a value obtained by deducting 90° from the optimum design phase difference.

From the results shown in FIGS. 8B, 9B, 10B, 11B, 12B, and 13B, an optical axis azimuth angle at which the ellipticity had the maximum value was extracted on each cutting angle. A relation thereof in a range of the cutting angle φ from 5° to 30° is plotted in FIG. 14A. Further, a relation between the cutting angle φ and a compensation amount a of the optical axis azimuth angle θ is plotted in FIG. 14B. From these graphs, a relation between the optical axis azimuth angle θ and the cutting angle φ at which the ellipticity can be set to be optimum, that is, set to be at a value which is close to 1 and is the maximum could be generalized as the following multinomial.

$$\theta = 45° - a \qquad \text{Formula 6}$$

$$a = \sum_{k=1}^{6} A_k \varphi^k$$

Here, $A_1$=24.3633333343

$A_2$=−6.0383333334

$A_3$=0.6068333334

$A_4$=−0.0303000000

$A_5$=0.0007453333

$A_6$=−0.0000072000

In the same manner, from the results of FIGS. 8A, 9A, 10A, 11A, 12A, and 13A, design phase difference at which the ellipticity has the maximum value was extracted on each cutting angle. Their relation in a range of the cutting angle φ from 5° to 30° is plotted in FIG. 15A. Further, a relation between the cutting angle φ and a compensation amount b of the phase difference Γ is plotted in FIG. 15B. From these graphs, a relation between the design phase difference Γ and the cutting angle φ at which the ellipticity can be set to be optimum, that is, set to be at a value which is close to 1 and is maximum could be generalized as the following multinomial.

$$\Gamma = 90° + b \qquad \text{Formula 7}$$

$$b = \sum_{k=1}^{6} B_k \varphi^k$$

Here, $B_1$=12.8166666674

$B_2$=−3.5807222225

$B_3$=0.3900833334

$B_4$=−0.0206388889

$B_5$=0.0005300000

$B_6$=−0.0000052889

The above description is about the quartz crystal quarter wave plate which converts linearly-polarized light into right-handed circularly-polarized light. The similar analysis method can be used for a quartz crystal quarter wave plate which converts linearly-polarized light into left-handed circularly-polarized light. In this case, a relation between an optical axis azimuth angle θ and a cutting angle φ at which ellipticity can be set to be optimum, that is, set to be at a value which is close to 1 and is maximum can be generalized as the following multinomial.

$$\theta = 135° - a \qquad \text{Formula 8}$$

$$a = \sum_{k=1}^{6} A_k \varphi^k$$

Here, $A_1$=24.3633333343

$A_2$=−6.0380000004

$A_3$=0.6068333334

$A_4$=−0.0303000000

$A_5$=0.0007453333

$A_6$=−0.0000072000

In a similar manner, a relation between design phase difference Γ and a cutting angle φ at which ellipticity can be set to be optimum, that is, set to be at a value which is close to 1 and is maximum can be generalized as the following multinomial.

$$\Gamma = 90° + b \qquad \text{Formula 9}$$

$$b = \sum_{k=1}^{6} B_k \varphi^k$$

Here,
$B_1$=12.8166666674
$B_2$=−3.5807222225
$B_3$=0.3900833334
$B_4$=−0.0206388889
$B_5$=0.0005300000
$B_6$=−0.0000052889

Thus, the ellipticity can be set to have a value which is close to 1 and is the maximum in the quartz crystal quarter wave plate which converts linearly-polarized light into left-handed circularly-polarized light, as well. Here, the above simulation is about a case where right-handed quartz crystal is used for a quarter wave plate. As known, right-handed quartz crystal has right-handed optical rotatory power by which polarized light of incident light is rotated clockwise when viewed from an emitting surface. On the other hand, left-handed quartz crystal has left-handed optical rotatory power by which polarized light of incident light is rotated counterclockwise when viewed from the emitting surface. Thus, the left-handed quartz crystal has optical rotatory power functioning in an inverse direction to that of the right-handed quartz crystal. Accordingly, in a case where left-handed quartz crystal is used as a birefringence material of a quarter wave plate, a direction for compensating the optical axis azimuth angle, that is, a positive and negative direction is set to be in an inversed manner to that in a case of right-handed quartz crystal.

In a case of a quarter wave plate which is made of left-handed quartz crystal and converts linearly-polarized light into right-handed circularly polarized light, a relation between an optical axis azimuth angle θ and a cutting angle φ at which ellipticity can be set to be optimum, that is, set to be at a value which is close to 1 and is maximum can be generalized as the following multinomial.

$$\theta = 45° + a \qquad \text{Formula 10}$$

$$a = \sum_{k=1}^{6} A_k \varphi^k$$

Here,
$A_1$=24.3633333343
$A_2$=−6.0380000004
$A_3$=0.6068333334
$A_4$=−0.0303000000
$A_5$=0.0007453333
$A_6$=−0.0000072000

Further, a relation between design phase difference Γ and a cutting angle φ at which ellipticity can be set to be optimum, that is, set to be at a value which is close to 1 and is maximum can be generalized as the following multinomial.

$$\Gamma = 90° - b \qquad \text{Formula 11}$$

$$b = \sum_{k=1}^{6} B_k \varphi^k$$

Here,
$B_1$=12.8166666674
$B_2$=−3.5807222225
$B_3$=0.3900833334
$B_4$=−0.0206388889
$B_5$=0.0005300000
$B_6$=−0.0000052889

In a case of a quarter wave plate which is made of left-handed quartz crystal and converts linearly-polarized light into left-handed circularly polarized light, a relation between an optical axis azimuth angle θ and a cutting angle φ at which ellipticity can be set to be optimum, that is, set to be at a value which is close to 1 and is maximum can be generalized as the following multinomial.

$$\theta = 135° + a \qquad \text{Formula 12}$$

$$a = \sum_{k=1}^{6} A_k \varphi^k$$

Here,
$A_1$=24.3633333343
$A_2$=−6.0380000004
$A_3$=0.6068333334
$A_4$=−0.0303000000
$A_5$=0.0007453333
$A_6$=−0.0000072000

Further, a relation between design phase difference Γ and a cutting angle φ at which ellipticity can be set to be optimum, that is, set to be at a value which is close to 1 and maximum can be generalized as the following multinomial.

$$\Gamma = 90° - b \qquad \text{Formula 13}$$

$$b = \sum_{k=1}^{6} B_k \varphi^k$$

Here,
$B_1$=12.8166666674
$B_2$=−3.5807222225
$B_3$=0.3900833334
$B_4$=−0.0206388889
$B_5$=0.0005300000
$B_6$=−0.0000052889

The present invention is forged based on such perception. A quarter wave plate that is a crystal plate made of an inorganic material having birefringence and optical rotatory power and has an optical axis, includes an incident surface positioned on one surface of the crystal plate; and an emitting surface positioned on another surface, which is opposed to the incident surface, of the crystal plate. In the quarter wave plate, linearly-polarized light incident from the incident surface is converted into circularly-polarized light so as to be emitted from the emitting surface, and circularly-polarized light incident from the incident surface is converted into linearly-polarized light so as to be emitted from the emitting surface. Further, in the wave plate, an angle φ formed by a normal line on the incident surface and the optical axis is set in a range of 0°<φ<90°, and an optical axis azimuth angle θ formed by an optical axis projection line, which is formed by projecting the optical axis on the incident surface, and a polarization plane of the linearly-polarized light is set in one of a range of 0°<θ<90° under θ≠45° and a range of 90°<θ<180° under θ≠135°.

As this, change of a polarization state due to the optical rotatory power of the crystal plate is compensated by setting a combination of an optimum optical axis azimuth angle θ and optimum designing phase difference Γ based on a cutting angle of the crystal plate, being able to set ellipticity of the wave plate to be maximum, that is, to have an optimum value which is as close to 1 as possible. Accordingly, the quarter wave plate of the first aspect not only exerts sufficient light resistance to blue-violet laser but also exhibits high reliability and excellent optical characteristic. The blue-violet laser has a short wavelength, is outputted in high power, and is especially used in an optical pickup device.

In the quarter wave plate according to the first aspect, the crystal plate may be made of quartz crystal; when the quartz crystal is right-handed quartz crystal, the optical axis azimuth angle θ may be set as 0°<θ<45° and phase difference Γ due to the birefringence of the quartz crystal may be set as Γ>90°; and when the quartz crystal is left-handed quartz crystal, the optical axis azimuth angle θ may be set as 45°<θ<90° and the phase difference Γ due to the birefringence of the quartz crystal may be set as Γ<90°. Accordingly, the ellipticity of the quarter wave plate can be set to be as close to 1 as possible in a manner to correspond to a cutting angle.

In the quarter wave plate according to the first aspect, the crystal plate may be made of quartz crystal; when the quartz crystal is right-handed quartz crystal, the optical axis azimuth angle θ may be set as 90°<θ<135° and phase difference Γ due to the birefringence of the quartz crystal may be set as Γ>90°; and when the quartz crystal is left-handed quartz crystal, the optical axis azimuth angle θ may be set as 135°<θ<180° and the phase difference Γ due to the birefringence of the quartz crystal may be set as Γ<90°. Accordingly, the ellipticity of the quarter wave plate can be set to be as close to 1 as possible in a manner to correspond to a cutting angle.

According to the aspect, change of the polarization state due to the optical rotatory power of the crystal plate can be effectively compensated by setting the cutting angle φ of the crystal plate in a range of 5°≦φ≦30°.

In the quarter wave plate according to the first aspect, it is preferable that when the optical axis azimuth angle θ is set as θ=45°−a and the phase difference Γ is set as Γ=90°+b in a case where the quartz crystal is right-handed quartz crystal under the angle φ set in a range of 5°≦φ≦30°, and when the optical axis azimuth angle θ is set as θ=45°−a and the phase difference Γ is set as Γ=90°−b in a case where the quartz crystal is left-handed quartz crystal under the angle φ set in a range of 5°≦φ≦30°, 1°≦a≦30° and 0°≦b≦12° be satisfied.

In the quarter wave plate according to the first aspect, it is preferable that when the optical axis azimuth angle θ is set as θ=135°−a and the phase difference Γ is set as Γ=90°+b in a case where the quartz crystal is right-handed quartz crystal under the angle φ set in a range of 5°≦φ≦30°, and when the optical axis azimuth angle θ is set as θ=135°+a and the phase difference Γ is set as Γ=90°−b in a case where the quartz crystal is left-handed quartz crystal under the angle φ set in a range of 5°≦φ≦30°, 1°≦a≦30° and 0°≦b≦12° be satisfied.

Further, in these cases, it is preferable that the a and the b respectively satisfy Formula 14 and Formula 15 below. Accordingly, the ellipticity of the quarter wave plate can be set to be closer to 1.

$$\theta = 45° - a \qquad \text{Formula 14}$$

$$a = \sum_{k=1}^{6} A_k \varphi^k$$

Here,
$A_1 = 24.3633333343$
$A_2 = -6.0380000004$
$A_3 = 0.6068333334$
$A_4 = -0.0303000000$
$A_5 = 0.0007453333$
$A_6 = -0.0000072000$ $$\Gamma = 90° + b \qquad \text{Formula 15}$$

$$b = \sum_{k=1}^{6} B_k \varphi^k$$

Here,
$B_1 = 12.8166666674$
$B_2 = -3.5807222225$
$B_3 = 0.3900833334$
$B_4 = -0.0206388889$
$B_5 = 0.0005300000$
$B_6 = -0.0000052889$ An optical pickup device according to a second aspect of the invention includes: a light source; an objective lens focusing light emitted from the light source on a recording medium; a detector detecting light reflected by the recording medium; and the quarter wave plate, according to the first aspect, disposed on an optical path between the light source and the objective lens. An optical pickup device suitable for an optical disk device of higher recording density can be achieved by using a quarter wave plate of which ellipticity is set at an optimum value which is closer to 1.

A reflective liquid crystal display device according to a third aspect of the invention includes: a light source; a color separation optical system separating light emitted from the light source into a plurality of light having different colors from each other; a plurality of polarization conversion elements allowing the respective light of different colors received from the color separation optical system to pass therethrough; a plurality of polarization beam splitters allowing the respective light having passed through the polarization conversion elements to pass therethrough; a plurality of reflective liquid crystal display elements on which the light respectively having passed through the polarization beam splitters are made incident; a color mixing optical system mixing the light respectively reflected by the reflective liquid crystal display elements; a projection lens projecting light, which is obtained by the mixture of the color mixing optical system, so as to form an image; and a plurality of quarter wave plates, according to the first aspect, disposed on respective optical paths between the reflective liquid crystal display elements and the polarization beam splitters. In a similar manner, a reflective liquid crystal display device of which contrast is improved compared to a related art can be achieved by using a quarter wave plate of which ellipticity is set at an optimum value which is closer to 1 as described above.

BRIEF DESCRIPTION OF THE DRAWINGS

The invention will be described with reference to the accompanying drawings, wherein like numbers reference like elements.

FIG. 16-1A is an elevation view showing a quarter wave plate of a first example of a first embodiment of the invention when the plate is viewed from a light emitting direction. FIG. 16-1B is a lateral view of the plate. FIG. 16-1C is a perspective view showing a polarization state of the plate. FIG. 16-2D is a diagram for explaining the polarization state by using a Poincare sphere.

FIG. 18-1A is an elevation view showing a quarter wave plate of a second example of the first embodiment when the plate is viewed from a light emitting direction. FIG. 18-1B is a lateral view of the plate. FIG. 18-1C is a perspective view showing a polarization state of the plate. FIG. 18-2D is a diagram for explaining the polarization state by using a Poincare sphere.

FIG. 19-1A is an elevation view showing a quarter wave plate of a third example of the first embodiment when the plate is viewed from a light emitting direction. FIG. 19-1B is a lateral view of the plate. FIG. 19-1C is a perspective view showing a polarization state of the plate. FIG. 19-2D is a diagram for explaining the polarization state by using a Poincare sphere.

FIG. 20-1A is an elevation view showing a quarter wave plate of a fourth example of the first embodiment when the plate is viewed from a light emitting direction. FIG. 20-1B is a lateral view of the plate. FIG. 20-1C is a perspective view showing a polarization state of the plate. FIG. 20-2D is a diagram for explaining the polarization state by using a Poincare sphere.

FIG. 21A is an elevation view showing a quarter wave plate of a first example of the second embodiment when the plate is viewed from the light emitting direction. FIG. 21B is a lateral view of the plate.

FIG. 22A is an elevation view showing a quarter wave plate of a second example of the second embodiment when the plate is viewed from the light emitting direction. FIG. 22B is a lateral view of the plate.

FIG. 28A is an elevation view showing another related art quarter wave plate when viewed from a light emitting direction. FIG. 28B is a lateral view of the plate. FIG. 28C is a perspective view showing a polarization state of the plate.

DESCRIPTION OF EXEMPLARY EMBODIMENTS

Preferred embodiments of the invention will now be described with reference to the accompanying drawings.

First Embodiment

Figures 2D, 16:
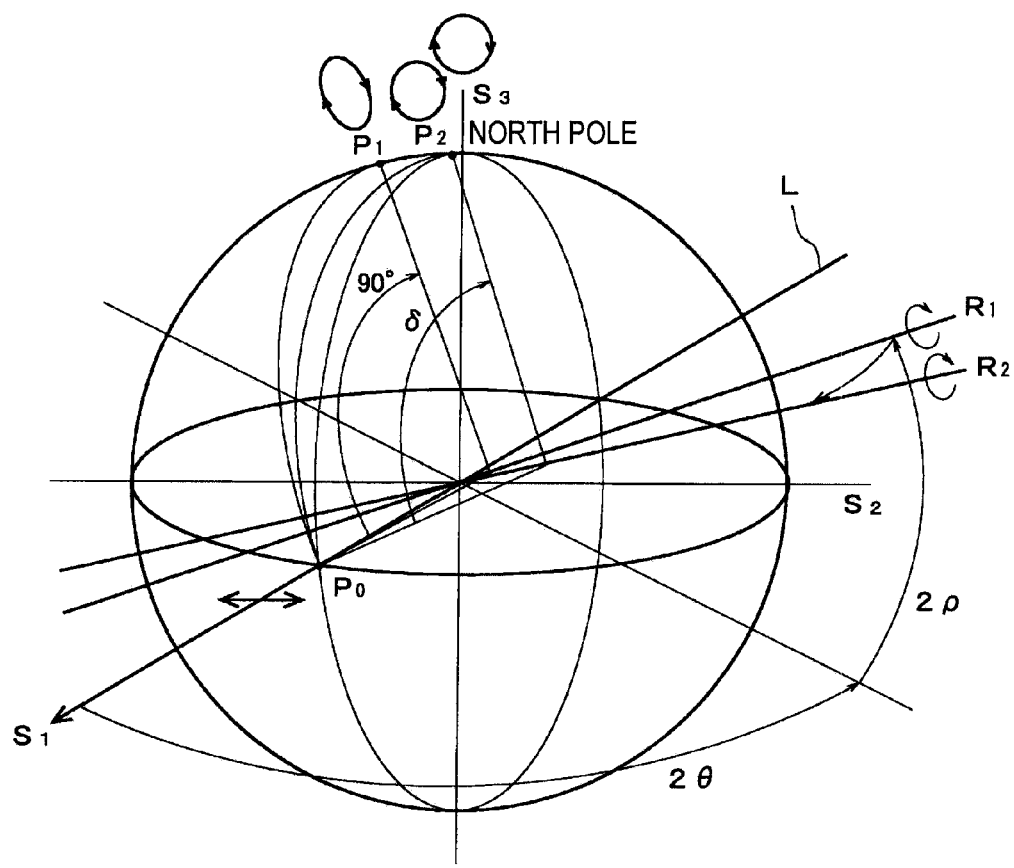
Figure 17:
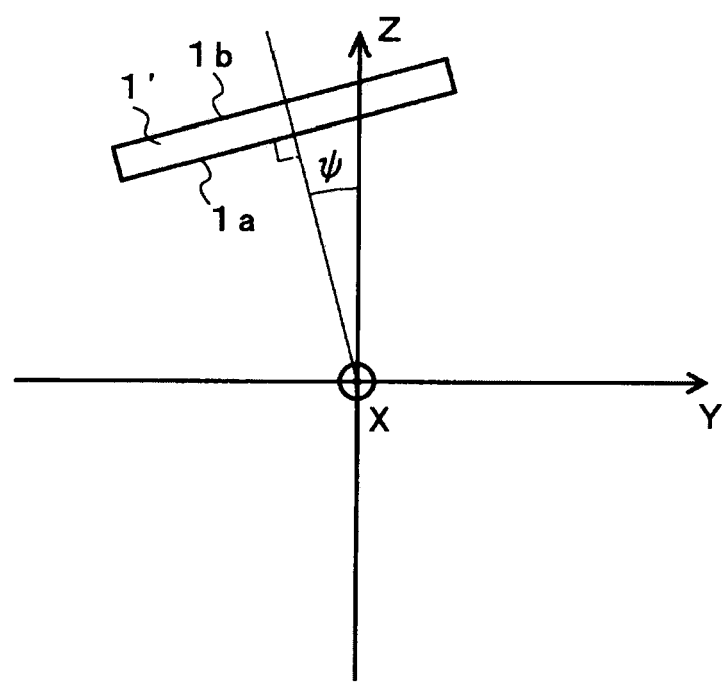
FIG. 17 is an explanatory diagram showing a cutting angle of a crystal plate which is the wave plate of FIGS. 16-1A to 16-1C and 16-2D.
Figures 1A, 19:
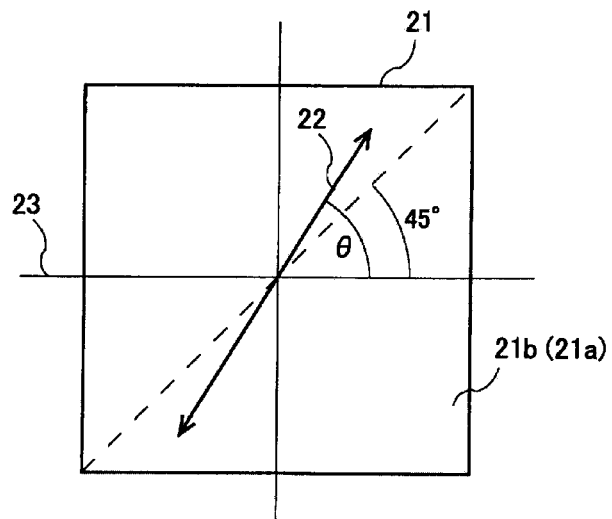
Figures 1B, 19:
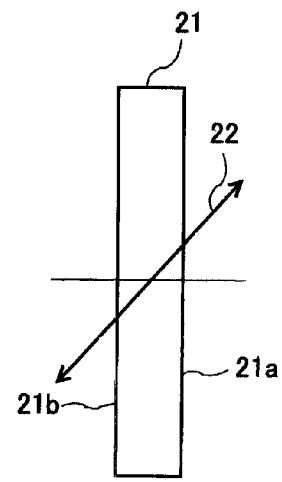

FIGS. 16-1A and 16-1B are diagrams schematically showing a quarter wave plate of a first embodiment of the invention. This quarter wave plate 1 of the first embodiment is composed of a single quartz crystal wave plate having an even thickness. This quartz crystal wave plate is cut out of a quartz crystal plate 1' having a cutting angle of 0°<φ<90° as shown in FIG. 17. The cutting angle is defined by a normal line on an incident surface 1a (or an emitting surface 1b) of the quartz crystal wave plate and an optical axis (Z axis). Especially, when the cutting angle φ is set in a range from 5° to 30°, such a quartz crystal wave plate can be processed that has a thickness of enough strength to be manufactured without difficulty as a quarter wave plate.

Figure 1:
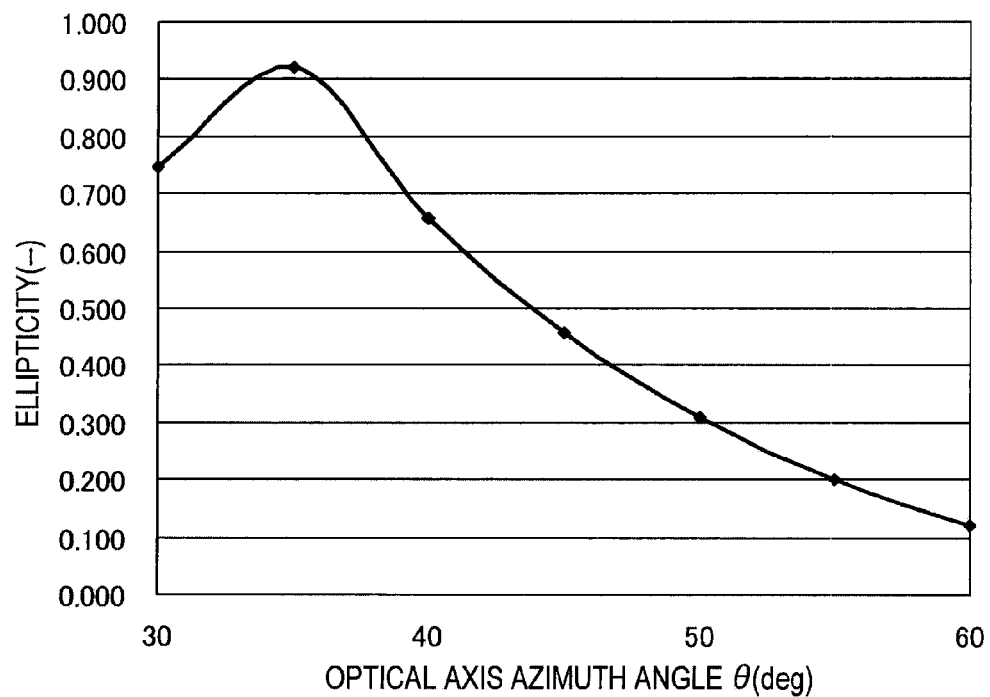
FIG. 1 is a graph showing a relation between an optical axis azimuth angle of a quarter wave plate and ellipticity.
Figure 2:
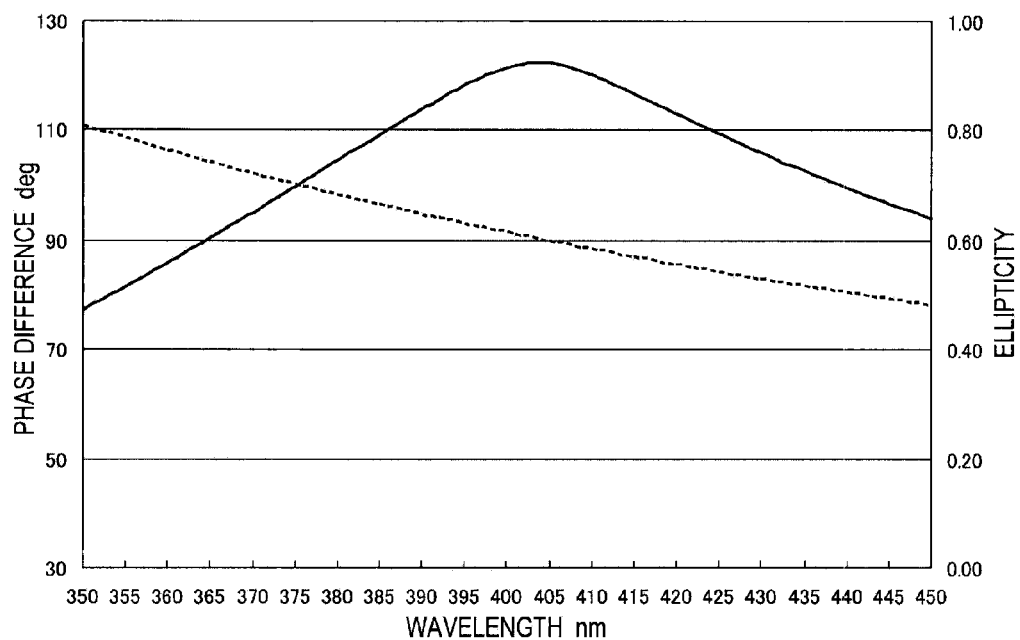
FIG. 2 is a graph showing wavelength dependency of phase difference and that of ellipticity under θ of 35° and phase difference of 90°.
Figure 3:
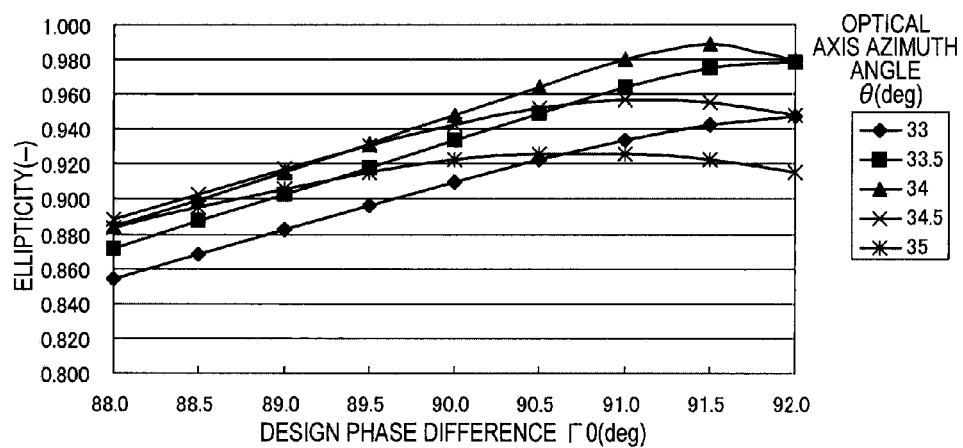
FIG. 3 is a graph showing change of ellipticity in relation to design phase difference in various cutting angles.
Figure 4:
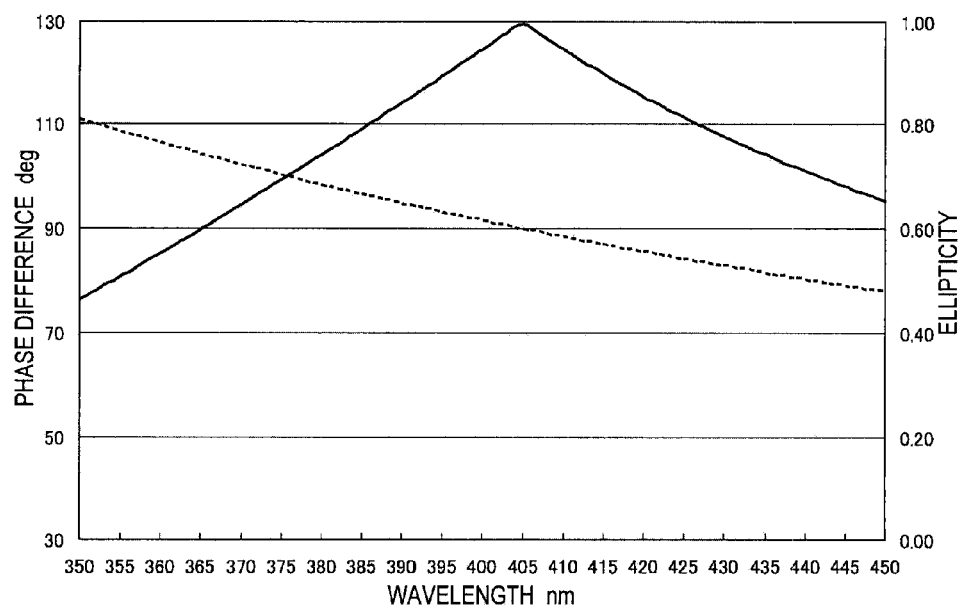
FIG. 4 is a graph showing wavelength dependency of phase difference and that of ellipticity under θ of 34° and phase difference of 91.5°.
Figure 5:
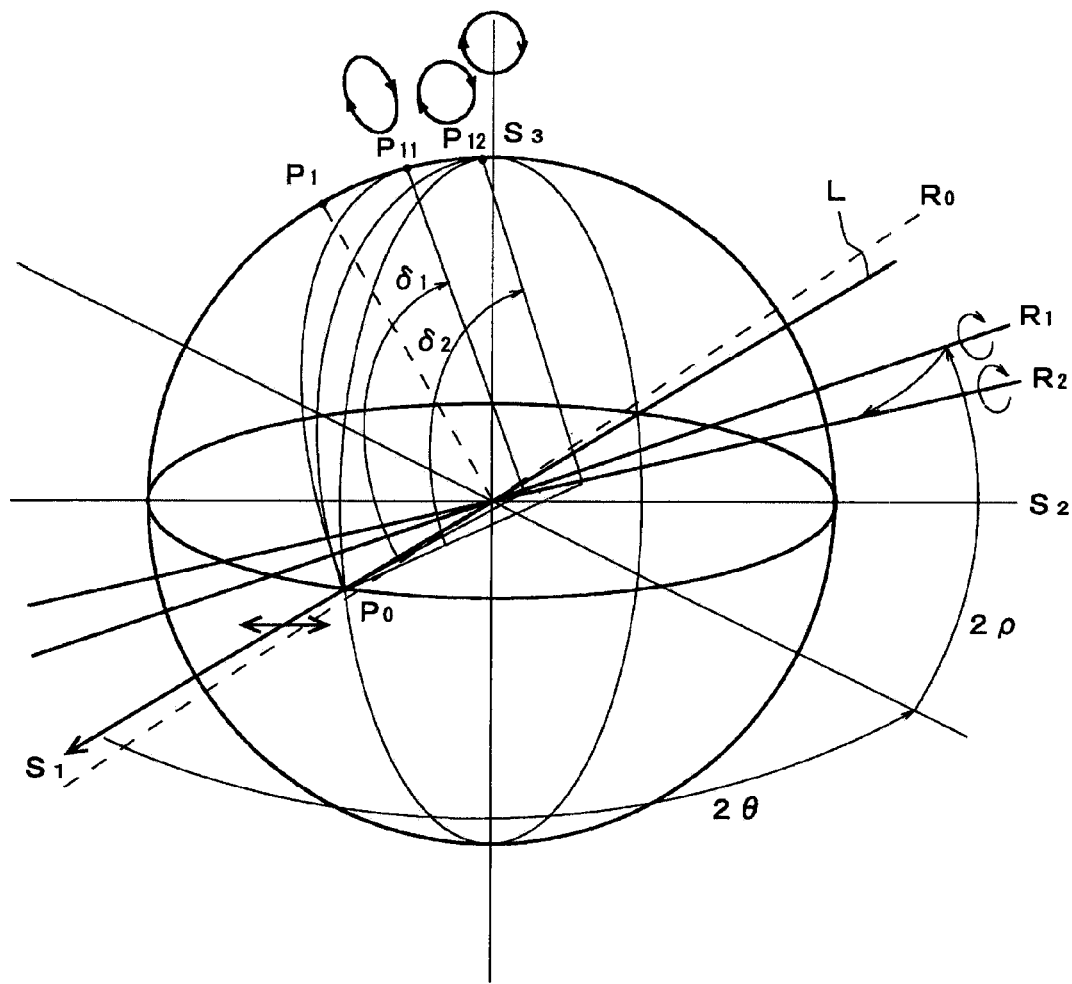
FIG. 5 is a diagram for explaining a polarization state of a wave plate of FIGS. 2 and 4 by using a Poincare sphere.
Figure 6A:
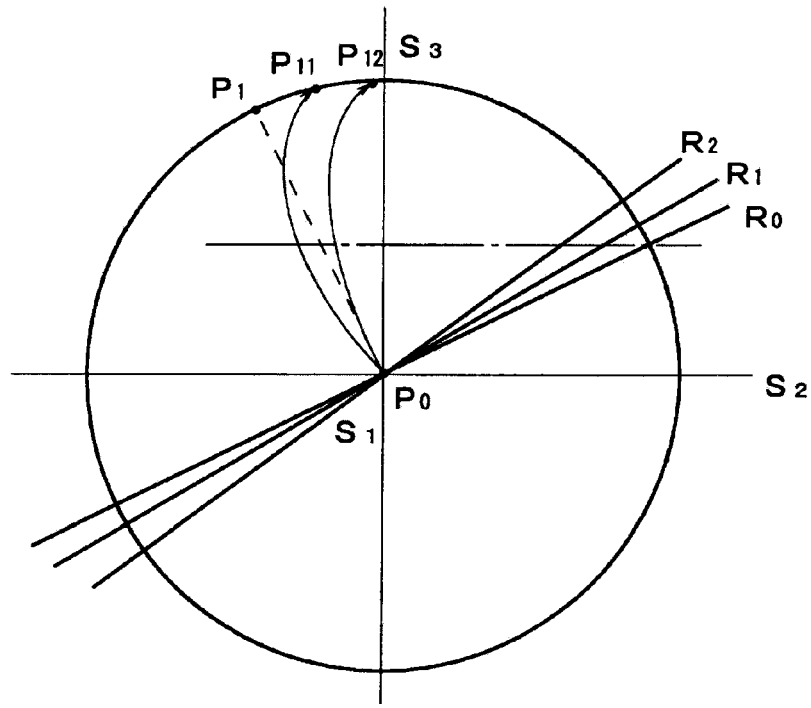
FIGS. 6A and 6B are diagrams respectively showing a front face and a plain face of the Poincare sphere of FIG. 5.
Figure 6B:
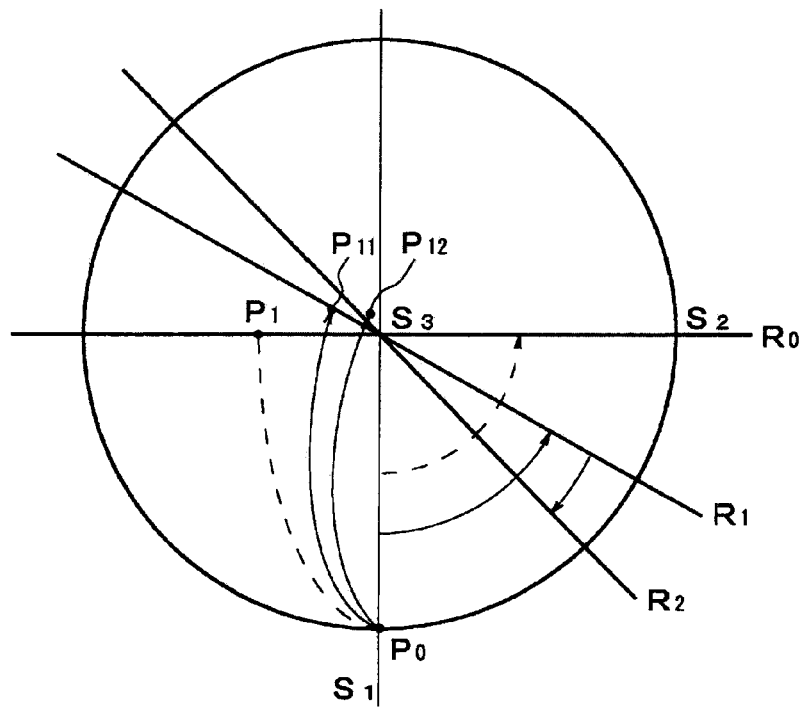
Figure 7:
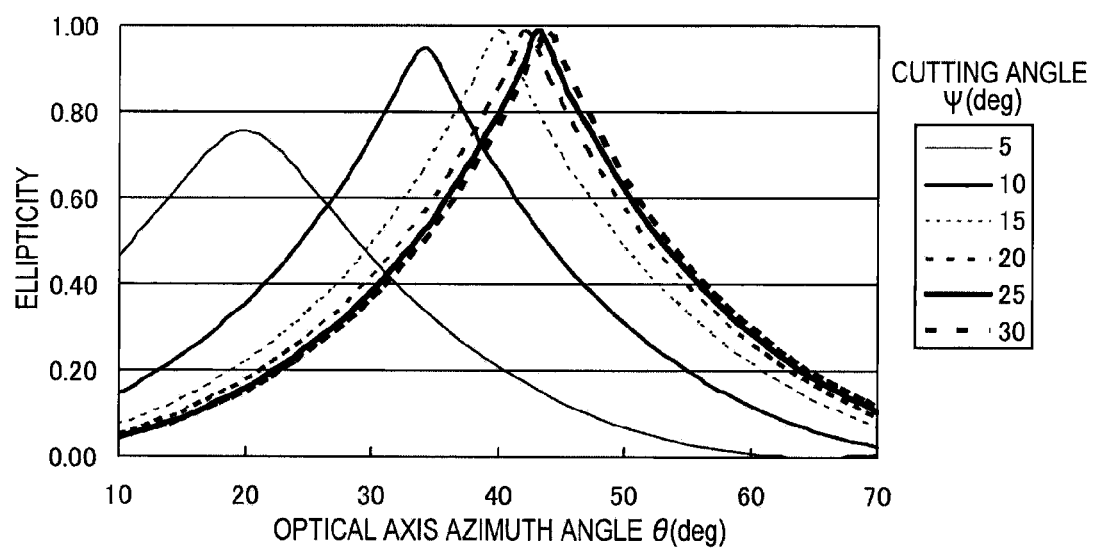
FIG. 7 is a graph showing a relation between an optical axis azimuth angle and ellipticity in cases of cutting angles from 5° to 30°.
Figure 8A:
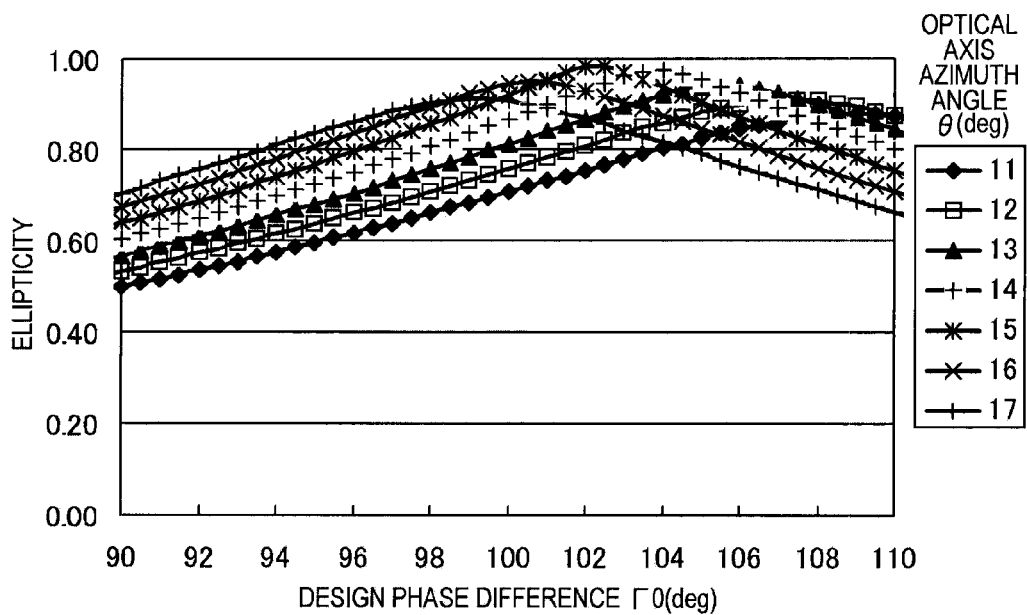
FIG. 8A is a graph showing a relation between design phase difference and ellipticity in relation to optical axis azimuth angles in a predetermined range including an optimum optical axis azimuth angle when the cutting angle is 5°.
Figure 8B:
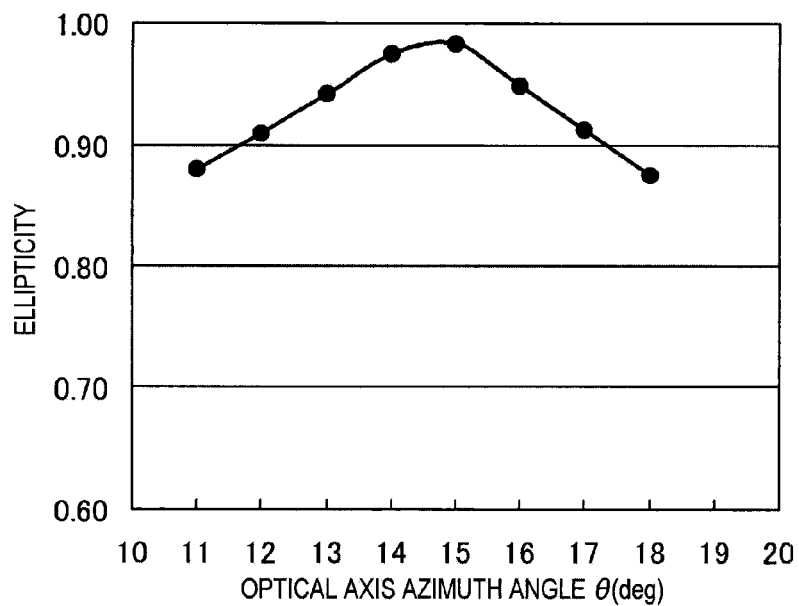
FIG. 8B is a graph between the optical axis azimuth angle and the ellipticity.
Figure 9A:
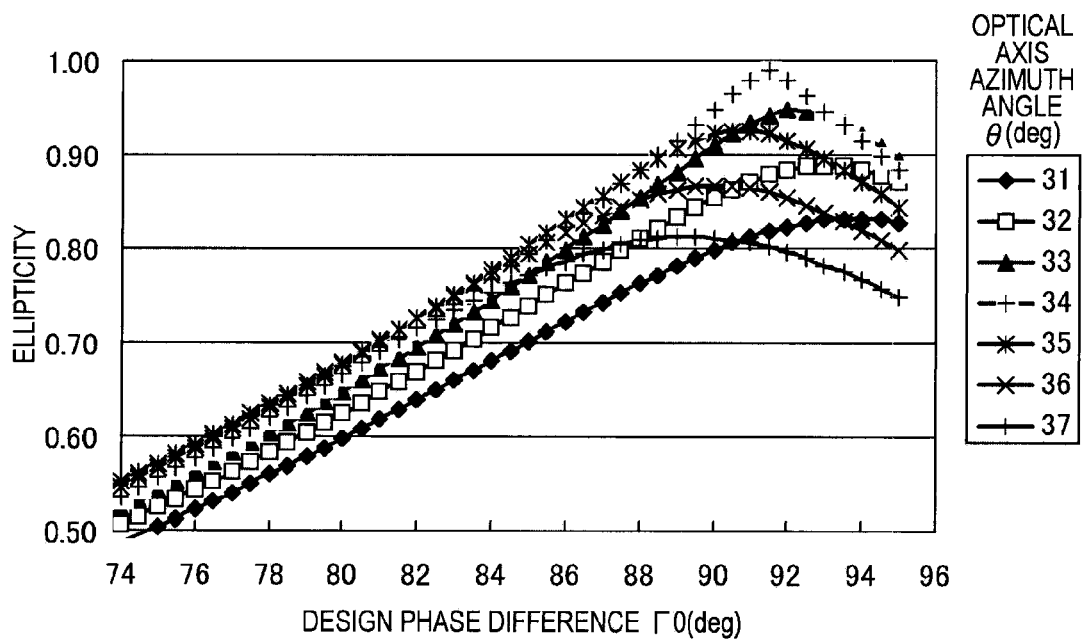
FIG. 9A is a graph showing a relation between design phase difference and ellipticity in relation to optical axis azimuth angles in a predetermined range including an optimum optical axis azimuth angle when the cutting angle is 10°.
Figure 9B:
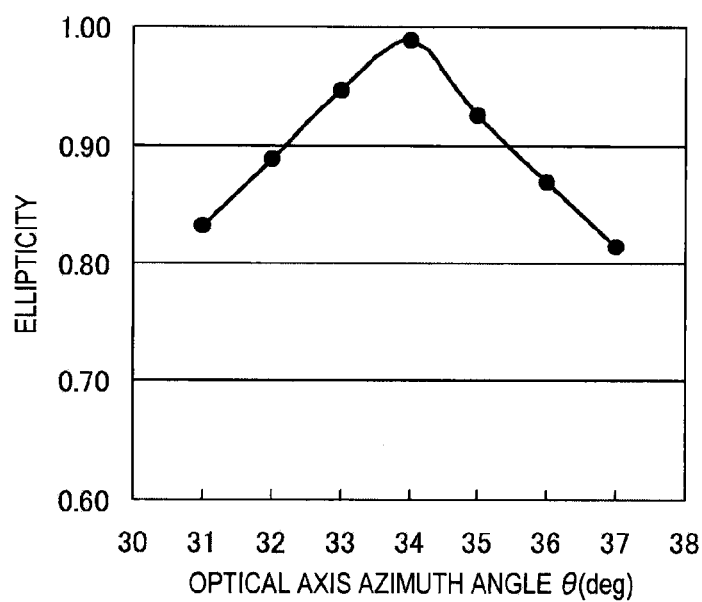
FIG. 9B is a graph between the optical axis azimuth angle and the ellipticity.
Figure 10A:
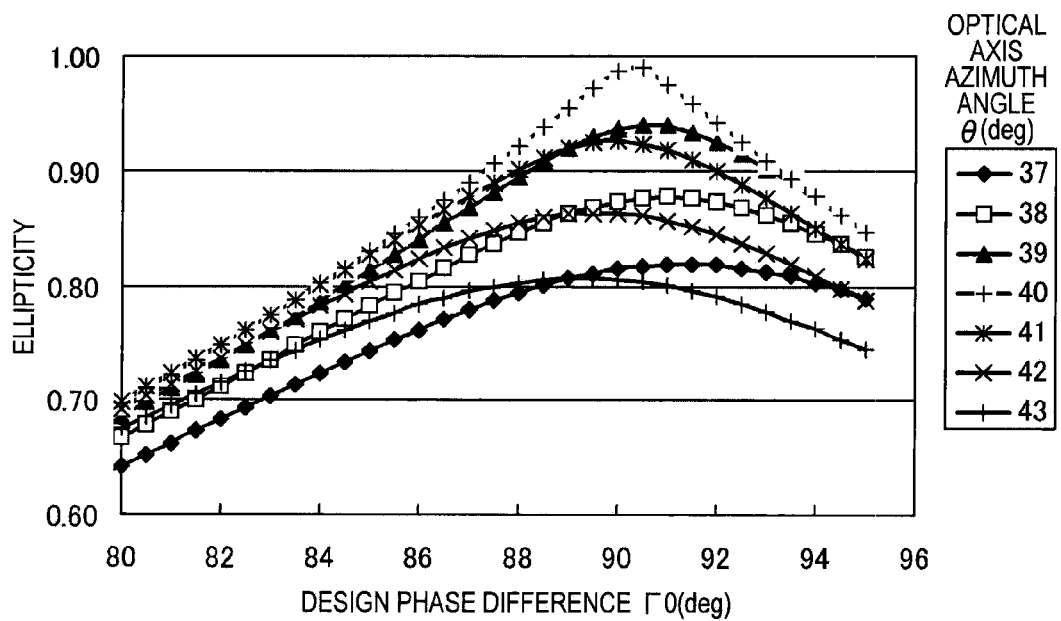
FIG. 10A is a graph showing a relation between design phase difference and ellipticity in relation to optical axis azimuth angles in a predetermined range including an optimum optical axis azimuth angle when the cutting angle is 15°.
Figure 10B:
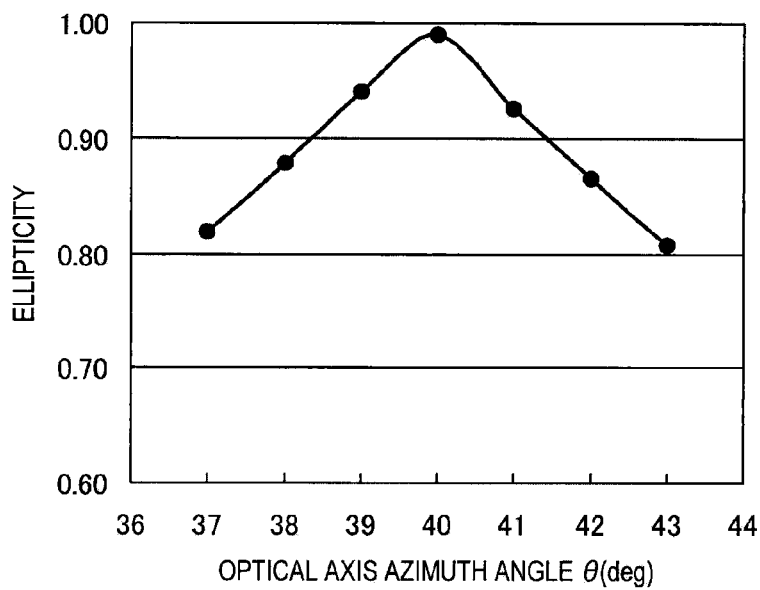
FIG. 10B is a graph between the optical axis azimuth angle and the ellipticity.
Figure 11A:
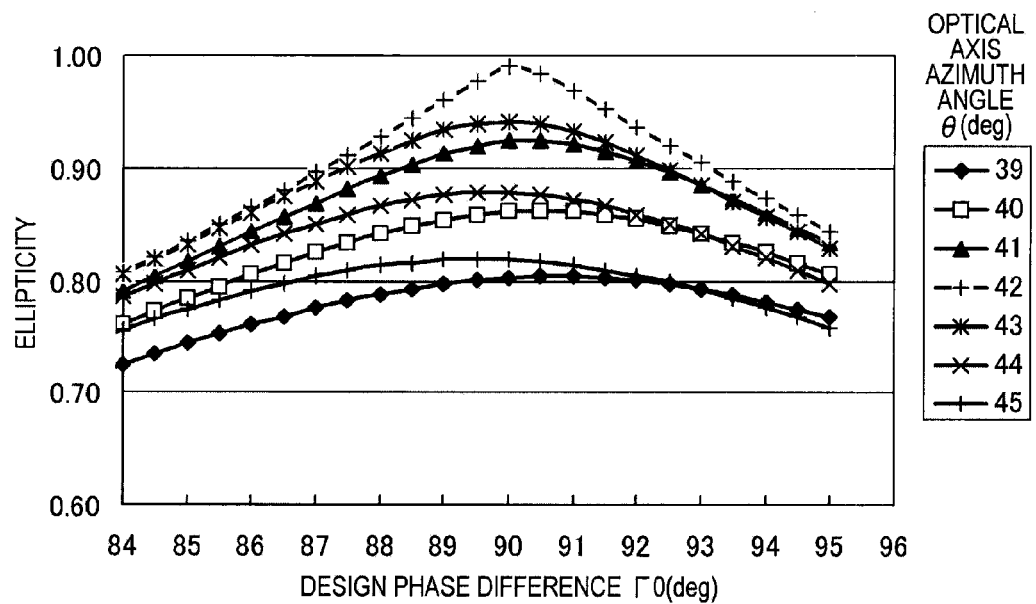
FIG. 11A is a graph showing a relation between design phase difference and ellipticity in relation to optical axis azimuth angles in a predetermined range including an optimum optical axis azimuth angle when the cutting angle is 20°.
Figure 11B:
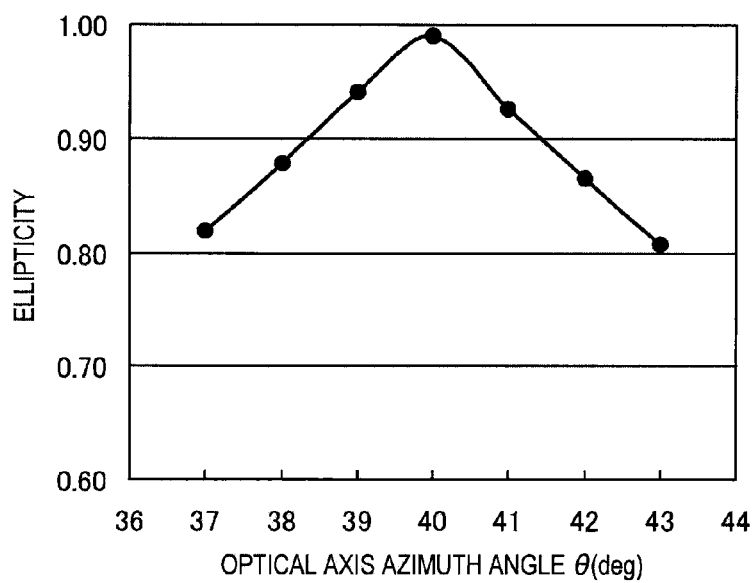
FIG. 11B is a graph between the optical axis azimuth angle and the ellipticity.
Figure 12A:
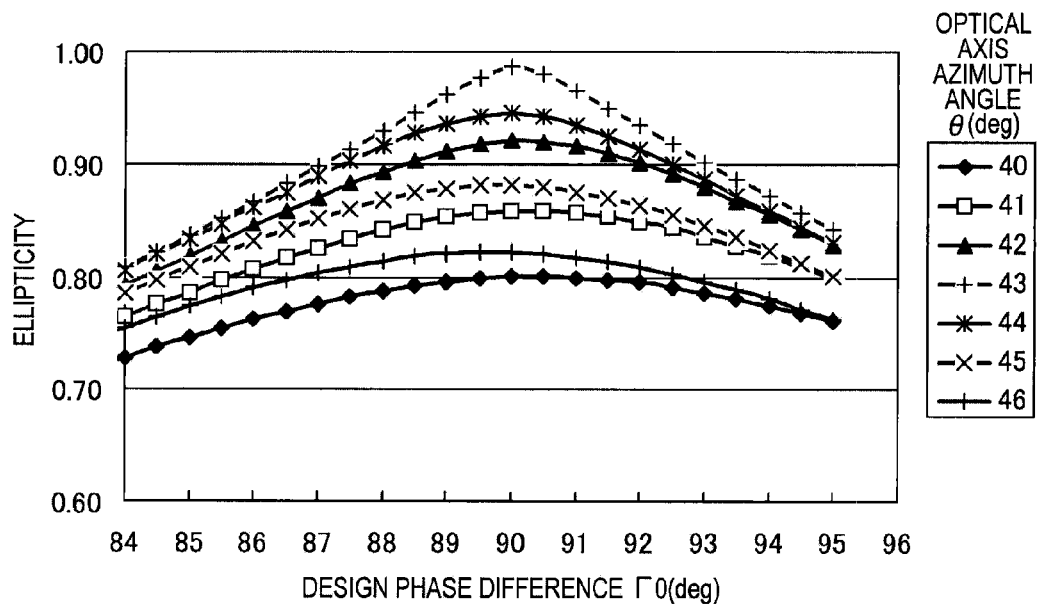
FIG. 12A is a graph showing a relation between design phase difference and ellipticity in relation to optical axis azimuth angles in a predetermined range including an optimum optical axis azimuth angle when the cutting angle is 25°.
Figure 12B:
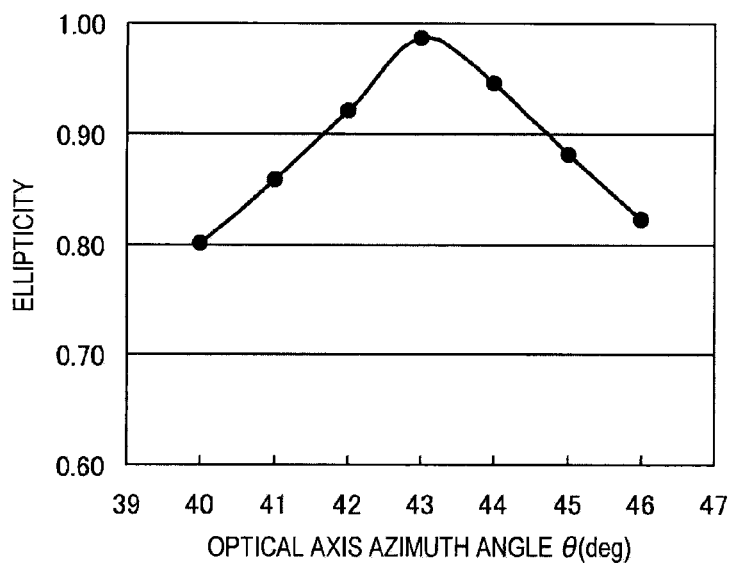
FIG. 12B is a graph between the optical axis azimuth angle and the ellipticity.
Figure 13A:
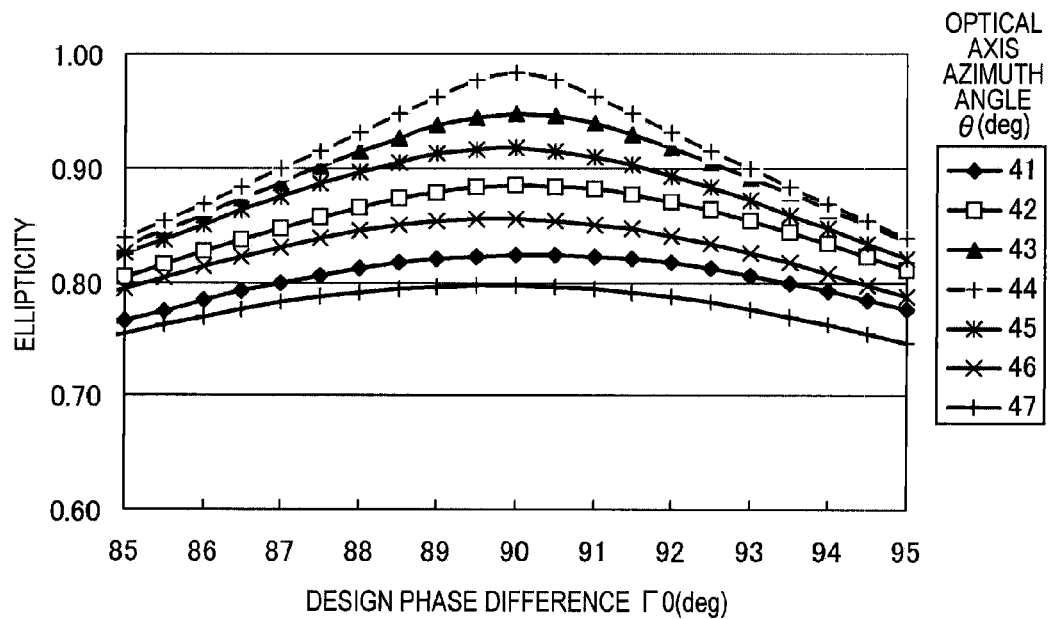
FIG. 13A is a graph showing a relation between design phase difference and ellipticity in relation to optical axis azimuth angles in a predetermined range including an optimum optical axis azimuth angle when the cutting angle is 30°.
Figure 13B:
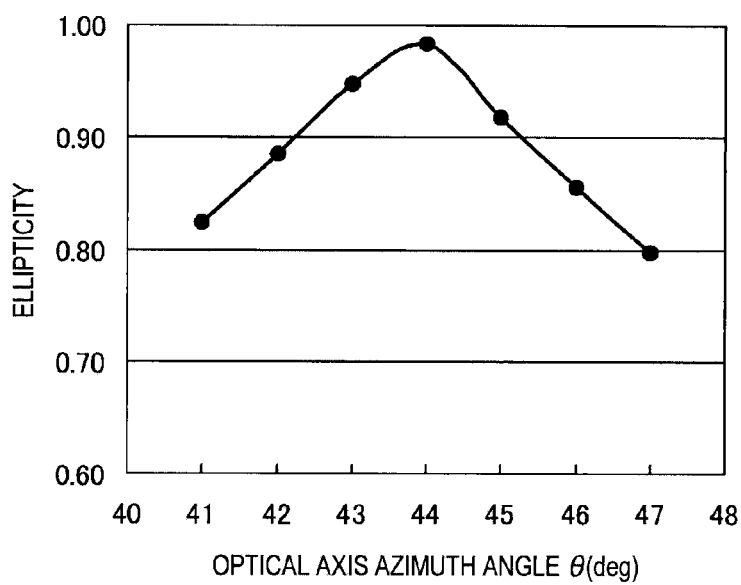
FIG. 13B is a graph between the optical axis azimuth angle and the ellipticity.
Figure 14A:
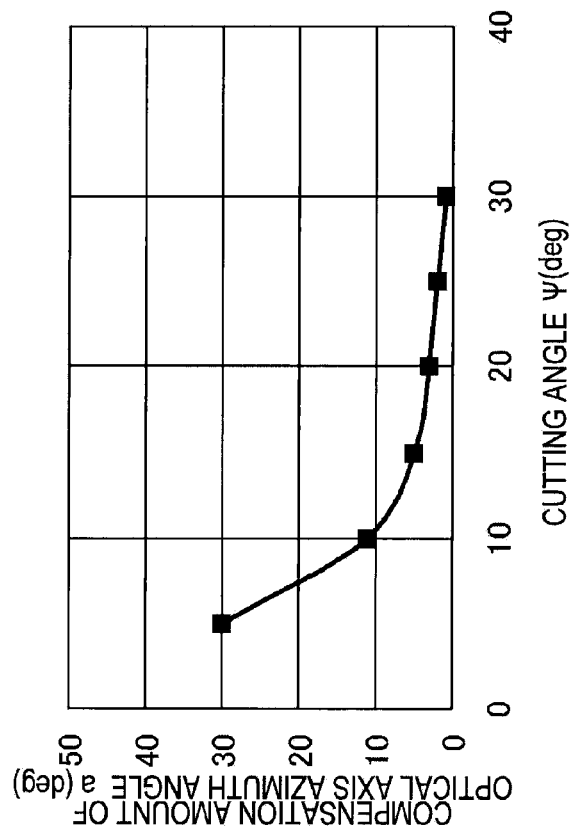
FIG. 14A is a graph showing a relation between an optical axis azimuth angle θ and a cutting angle φ at which ellipticity is optimized.
Figure 14B:
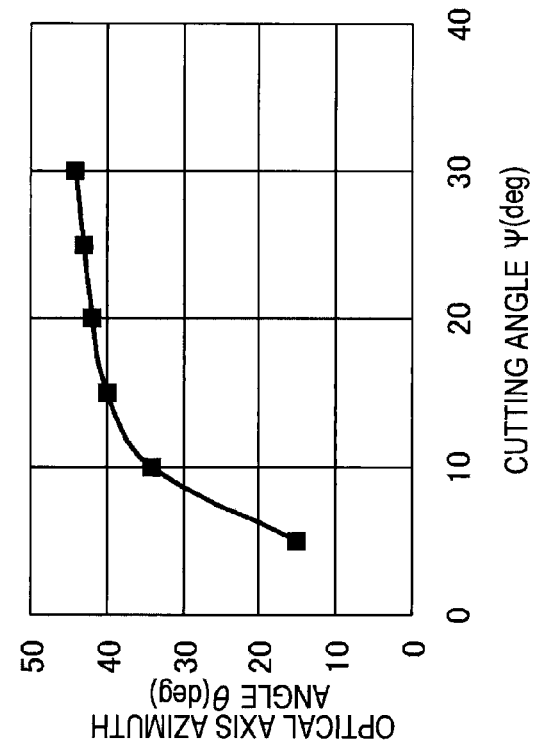
FIG. 14B is a graph showing a relation between a compensation amount a of the optical axis azimuth angle and the cutting angle φ.

The quarter wave plate 1 of the first embodiment is made of right handed quartz crystal and has right-handed optical rotatory power by which linearly-polarized light of the incident light is converted into right-handed circularly-polarized light. In the wave plate 1, an optical axis azimuth angle θ, that is, an angle formed by an optical axis 2 projected on the incident surface 1a and a direction 3 of a polarization plane of the incident linearly-polarized light is set to be smaller than a conventional angle of 45°, specifically, set in a range of 15°≦θ<45°. An optimum optical axis azimuth angle θ corresponding to the cutting angle φ is determined by using the following formulas aforementioned in connection with FIGS. 14A and 14B.

$$\theta = 45° - a \qquad \text{Formula 16}$$

$$a = \sum_{k=1}^{6} A_k \varphi^k$$

Here,
$A_1$=24.3633333343
$A_2$=−6.0380000004
$A_3$=0.6068333334
$A_4$=−0.0303000000
$A_5$=0.0007453333
$A_6$=−0.0000072000

Figure 15B:
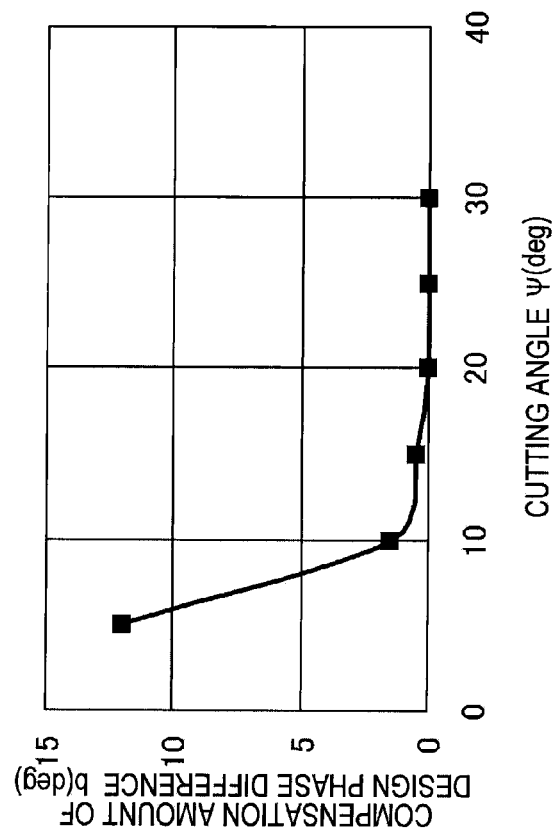
FIG. 15B is a graph showing a relation between a compensation amount b of the design phase difference and the cutting angle φ.
Figure 15A:
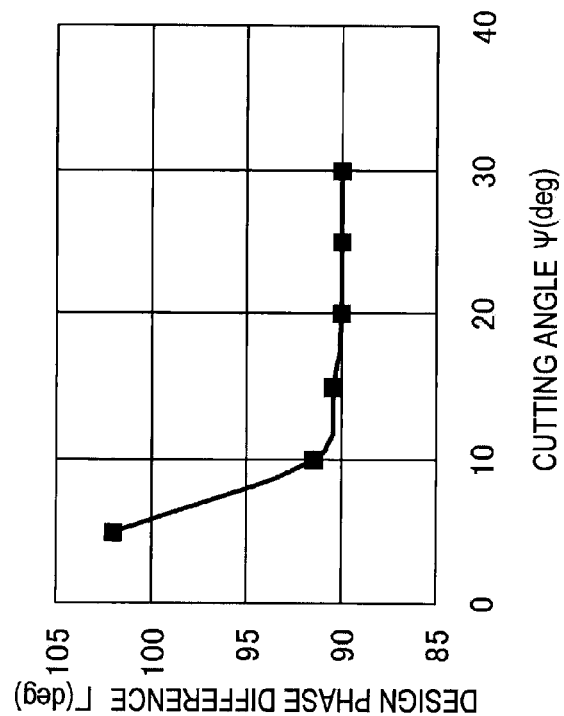
FIG. 15A is a graph showing a relation between design phase difference Γ and a cutting angle φ at which ellipticity is optimized.

Further, an optimum value of designing phase difference Γ of the wave plate 1 is determined in a manner to correspond to a cutting angle φ by using the following formulas aforementioned in connection with FIGS. 15A and 15B.

$$\Gamma = 90° + b \qquad \text{Formula 17}$$

$$b = \sum_{k=1}^{6} B_k \varphi^k$$

Here,
$B_1$=12.8166666674
$B_2$=−3.5807222225
$B_3$=0.3900833334
$B_4$=−0.0206388889
$B_5$=0.0005300000
$B_6$=−0.0000052889

For example, in a case where the quarter wave plate 1 made of right-handed quartz crystal is designed such that the cutting angle φ is 13°, a=6.1° is derived from Formula 16 above. Therefore, the optimum optical axis azimuth angle θ is 45°−6.1°=38.9°. Further, b=0.3 is derived from Formula 17 above, so that the optimum designing phase difference Γ is 90°+0.3°=90.3°.

Figures 1C, 19:
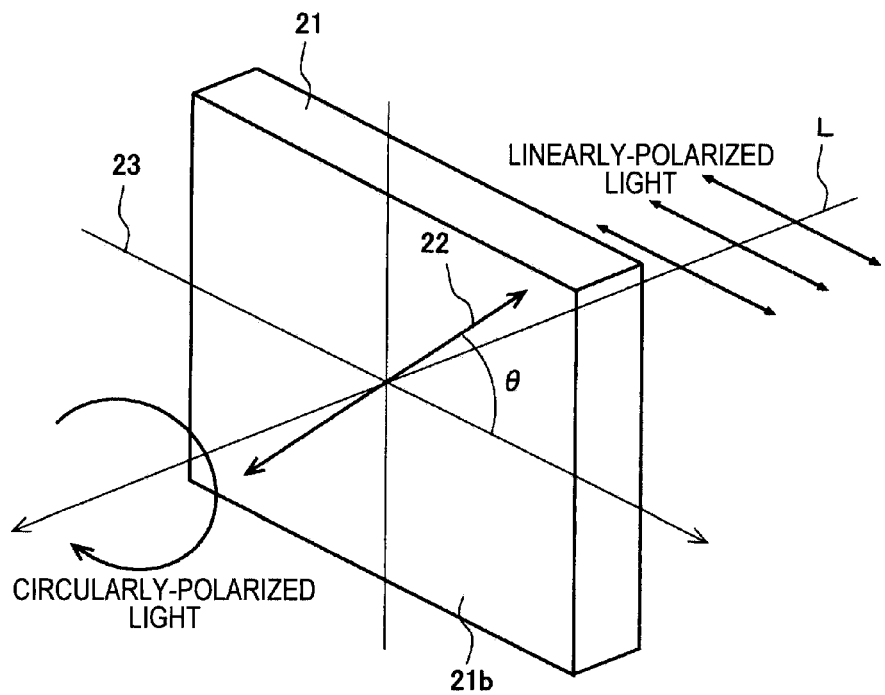
Figures 2D, 19:
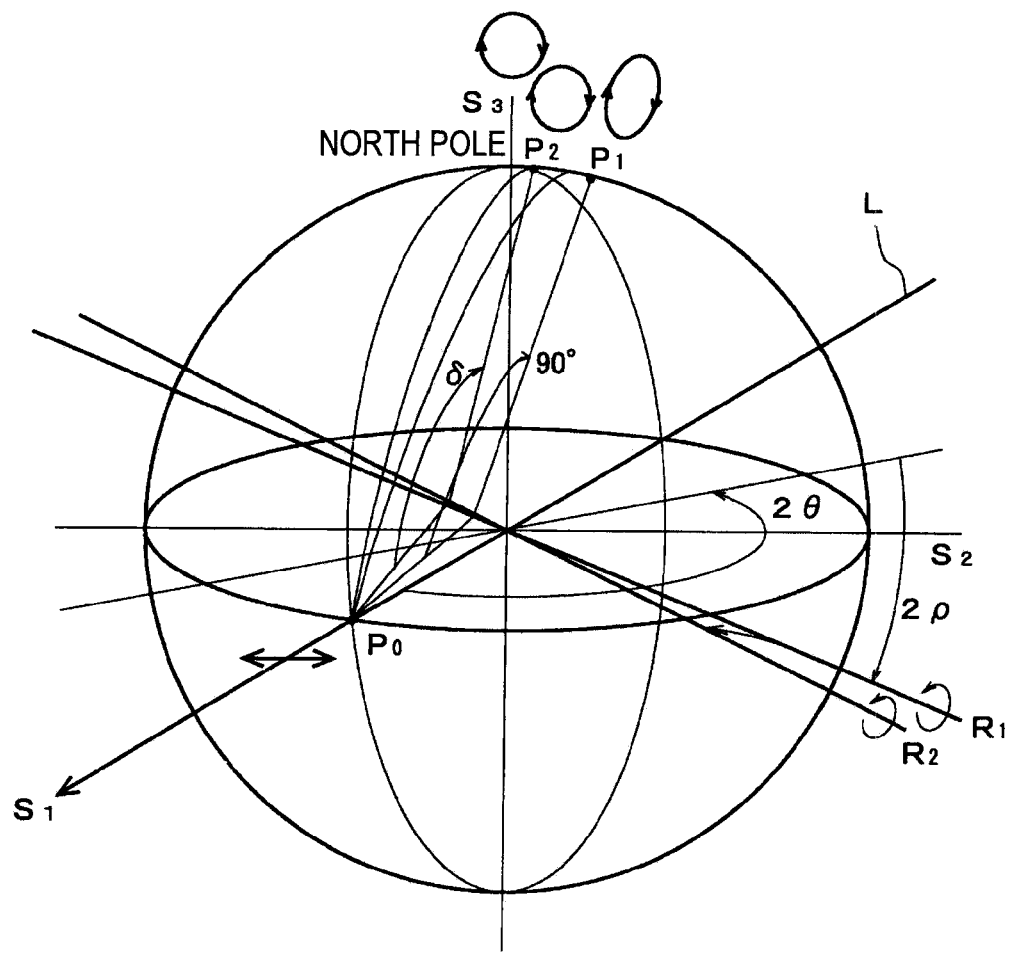

As shown in FIG. 16-1C, phase difference due to birefringence of quartz crystal and rotation of the polarization plane due to the optical rotatory power act on the linearly polarized light incident from the incident surface 1a of the quarter wave plate 1. However, the optimum optical axis azimuth angle θ and the optimum design phase difference Γ are determined based on the cutting angle φ as described above, so that the phase difference δ and the optical axis azimuth angle θ are set at optimum values in the quarter wave plate 1. Accordingly, the incident linearly-polarized light is converted into elliptically-polarized light having ellipticity of approximately 1 so as to be emitted practically as circularly-polarized light from the emitting surface 1b.

This optical mechanism is described with reference to a Poincare sphere shown in FIG. 16-2D. A reference point $P_o$ of the incident linearly-polarized light parallel to an S1-S2 plane is set to as $P_o$=(1, 0, 0), a rotation axis $R_1$ is set at a position by being rotated by 2θ from an S1 axis and further, the rotation axis $R_1$ is tilted by an angle of 2ρ (ρ is an optical rotatory angle of the quartz crystal plate) with respect to the S1-S2 plane in a north pole (S3) direction. Further, a rotation axis $R_2$ is set at a position where the rotation axis $R_1$ is rotated so as to slightly return toward the S1 axis. The reference point $P_o$ is rotated clockwise around the rotation axis $R_2$ by an optimum phase difference δ obtained by adding a compensation amount to a common design phase difference of 90°, so as to reach a point $P_2$ which nearly matches the north pole on the sphere. The point $P_2$ is a position from which light is practically emitted, so that the incident linearly-polarized light is converted into the circularly-polarized light and emitted.

Figures 2D, 18:
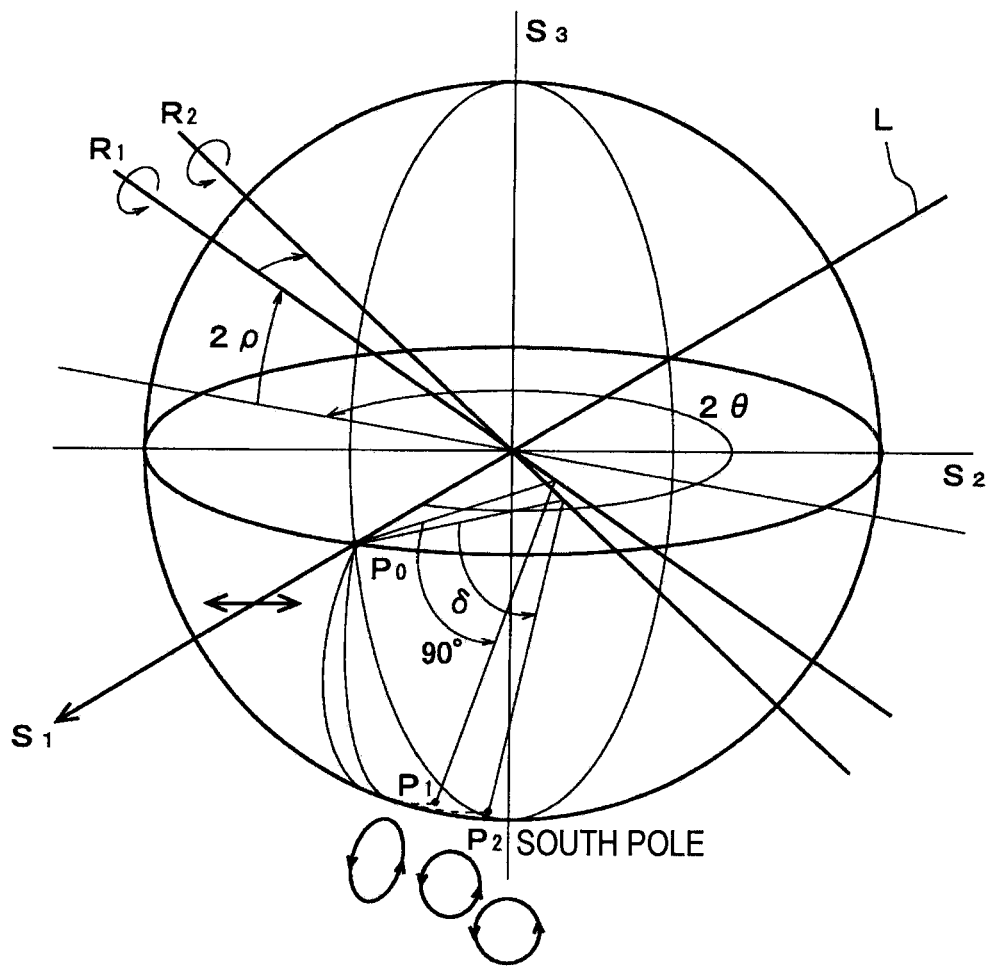

FIGS. 18-1A and 18-1B are diagrams schematically showing a second example of the quarter wave plate of the first embodiment. A quarter wave plate 11 of the second example is made of right-handed quartz crystal and has left-handed optical rotatory power by which linearly-polarized light of incident light is converted into left-handed circularly-polarized light. In the wave plate 11, an optical axis azimuth angle θ, that is, an angle formed by an optical axis 12 projected on an incident surface 11a and a direction 13 of a polarization plane of the incident linearly-polarized light is set to be smaller than a conventional angle of 135°, specifically, in a range of 105°≦θ<135°.

An optimum optical axis azimuth angle θ corresponding to a cutting angle φ is determined by using Formula 18.

$$\theta = 135° - a \qquad \text{Formula 18}$$

$$a = \sum_{k=1}^{6} A_k \varphi^k$$

Here,
$A_1$=24.3633333343
$A_2$=−6.0380000004
$A_3$=0.6068333334
$A_4$=−0.0303000000
$A_5$=0.0007453333
$A_6$=−0.0000072000

Further, an optimum value of a design phase difference Γ of the wave plate 11 is determined in a manner to correspond to the cutting angle φ by using Formula 19.

$$\Gamma = 90° + b \quad \text{Formula 19}$$

$$b = \sum_{k=1}^{6} B_k \varphi^k$$

Here, $B_1 = 12.8166666674$
$B_2 = -3.5807222225$
$B_3 = 0.3900833334$
$B_4 = -0.0206388889$
$B_5 = 0.0005300000$
$B_6 = -0.0000052889$ As shown in FIG. 18-1C, phase difference due to birefringence of quartz crystal and rotation of the polarization plane due to the optical rotatory power act on the linearly-polarized light incident from the incident surface 11a of the quarter wave plate 11. However, an optimum optical axis azimuth angle θ and optimum design phase difference Γ are determined based on the cutting angle φ as described above, so that the phase difference δ and the optical axis azimuth angle θ are set at optimum values in the quarter wave plate 11. Accordingly, the incident linearly polarized light is converted into elliptically-polarized light having ellipticity of approximately 1 and is emitted practically as circularly-polarized light from the emitting surface 11b.

This optical mechanism is described with reference to a Poincare sphere shown in FIG. 18-2D. A reference point $P_o$ of the incident linearly-polarized light parallel to an S1-S2 plane is set to as $P_o = (1, 0, 0)$, a rotation axis $R_1$ is set at a position by being rotated by 2θ from an S1 axis and further, the rotation axis $R_1$ is tilted by an angle of 2ρ (ρ is an optical rotatory angle of the quartz crystal plate) with respect to the S1-S2 plane in a north pole (S3) direction. Further, a rotation axis $R_2$ is set at a position where the rotation axis $R_1$ is rotated so as to slightly return toward the S1 axis. The reference point $P_o$ is rotated clockwise around the rotation axis $R_2$ by an optimum phase difference δ obtained by adding a compensation amount to common design phase difference of 90°, so as to reach a point $P_2$ which nearly matches the south pole on the sphere. The point $P_2$ is a position from which light is practically emitted, so that the incident linearly-polarized light is converted into the circularly-polarized light and emitted.

FIGS. 19-1A and 19-1B are diagrams schematically showing a quarter wave plate 21 of a third example of the first embodiment. The quarter wave plate 21 of the third example is made of left-handed quartz crystal and has right-handed optical rotatory power by which linearly-polarized light of incident light is converted into right-handed circularly-polarized light. In the wave plate 21, an optical axis azimuth angle θ, that is, an angle formed by an optical axis 22 projected on an incident surface 21a and a direction 23 of a polarization plane of the incident linearly-polarized light is set to be larger than a conventional angle of 45°, specifically, in a range of 45° < θ ≦ 75°.

An optimum optical axis azimuth angle θ corresponding to the cutting angle φ is determined by using Formula 20 below.

$$\theta = 45° + a \quad \text{Formula 20}$$

$$a = \sum_{k=1}^{6} A_k \varphi^k$$

Here, $A_1 = 24.3633333343$
$A_2 = -6.0380000004$
$A_3 = 0.6068333334$
$A_4 = -0.0303000000$
$A_5 = 0.0007453333$
$A_6 = -0.0000072000$ Further, an optimum value of design phase difference Γ of the wave plate 21 is determined in a manner to correspond to a cutting angle φ by using Formula 21 below.

$$\Gamma = 90° - b \quad \text{Formula 21}$$

$$b = \sum_{k=1}^{6} B_k \varphi^k$$

Here, $B_1 = 12.8166666674$
$B_2 = -3.5807222225$
$B_3 = 0.3900833334$
$B_4 = -0.0206388889$
$B_5 = 0.0005300000$
$B_6 = -0.0000052889$ As shown in FIG. 19-1C, phase difference due to birefringence of quartz crystal and rotation of the polarization plane due to the optical rotatory power act on the linearly-polarized light incident from the incident surface 21a of the quarter wave plate 21. However, an optimum optical axis azimuth angle θ and optimum designing phase difference Γ are determined based on a cutting angle φ as described above, so that the phase difference δ and the optical axis azimuth angle θ are set at optimum values in the quarter wave plate 21. Accordingly, the incident linearly-polarized light is converted into elliptically-polarized light having ellipticity of approximately 1 and is emitted practically as circularly-polarized light from the emitting surface 21b.

This optical mechanism is described with reference to a Poincare sphere shown in FIG. 19-2D. A reference point $P_o$ of the incident linearly-polarized light parallel to an S1-S2 plane is set to as $P_o = (1, 0, 0)$, a rotation axis $R_1$ is set at a position by being rotated by 2θ from an S1 axis and further, the rotation axis $R_1$ is tilted by an angle of 2ρ (ρ is an optical rotatory angle of the quartz crystal plate) with respect to the S1-S2 plane in the north pole (S3) direction. Further, a rotation axis $R_2$ is set at a position where the rotation axis $R_1$ is rotated so as to be set slightly forward from the S1 axis. The reference point $P_o$ is rotated clockwise around the rotation axis $R_2$ by an optimum phase difference δ obtained by adding a compensation amount to common design phase difference of 90°, so as to reach a point $P_2$ which nearly matches the north pole on the sphere. The point $P_2$ is a position from which light is practically emitted, so that the incident linearly-polarized light is converted into the circularly-polarized light and emitted.

Figures 1A, 20:
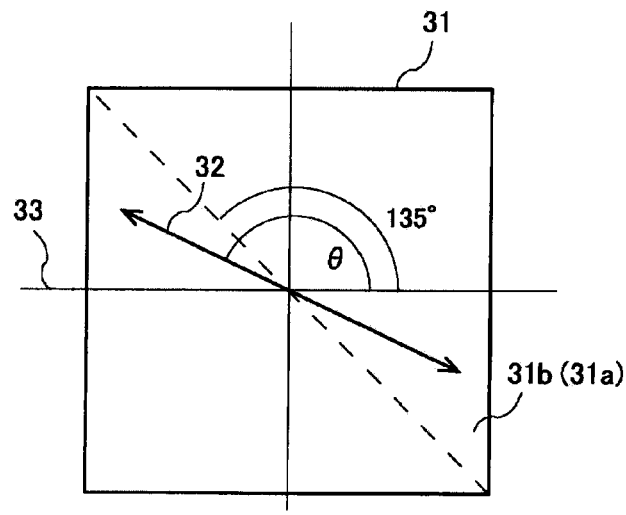
Figures 1B, 20:
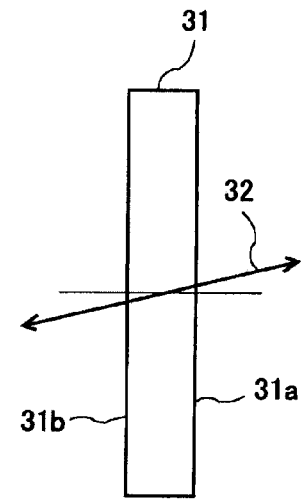
Figures 1C, 20:
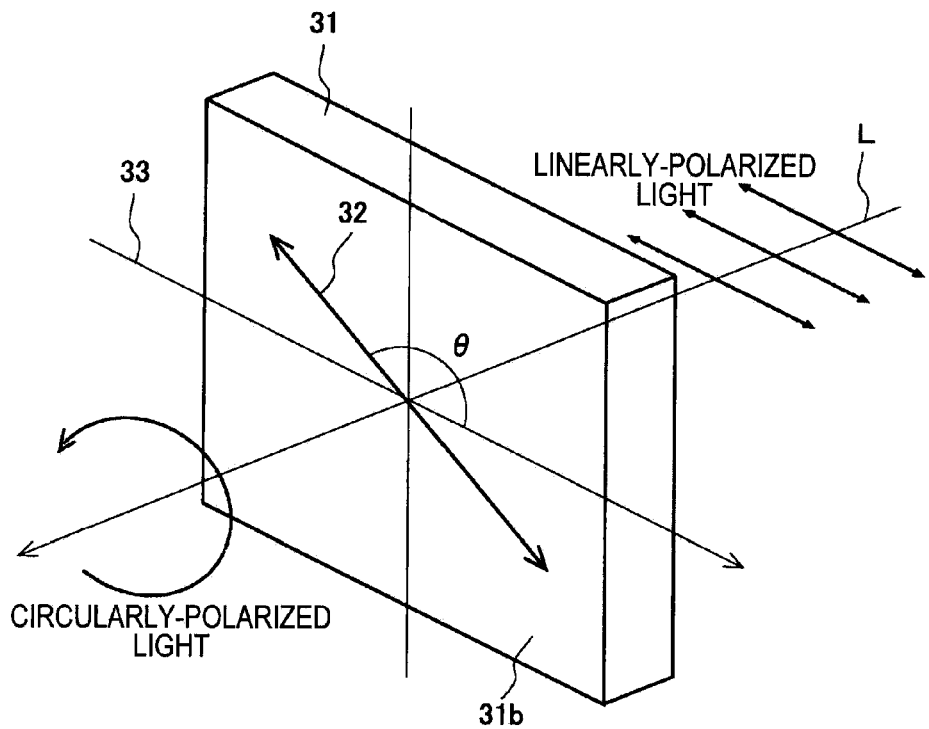
Figures 2D, 20:
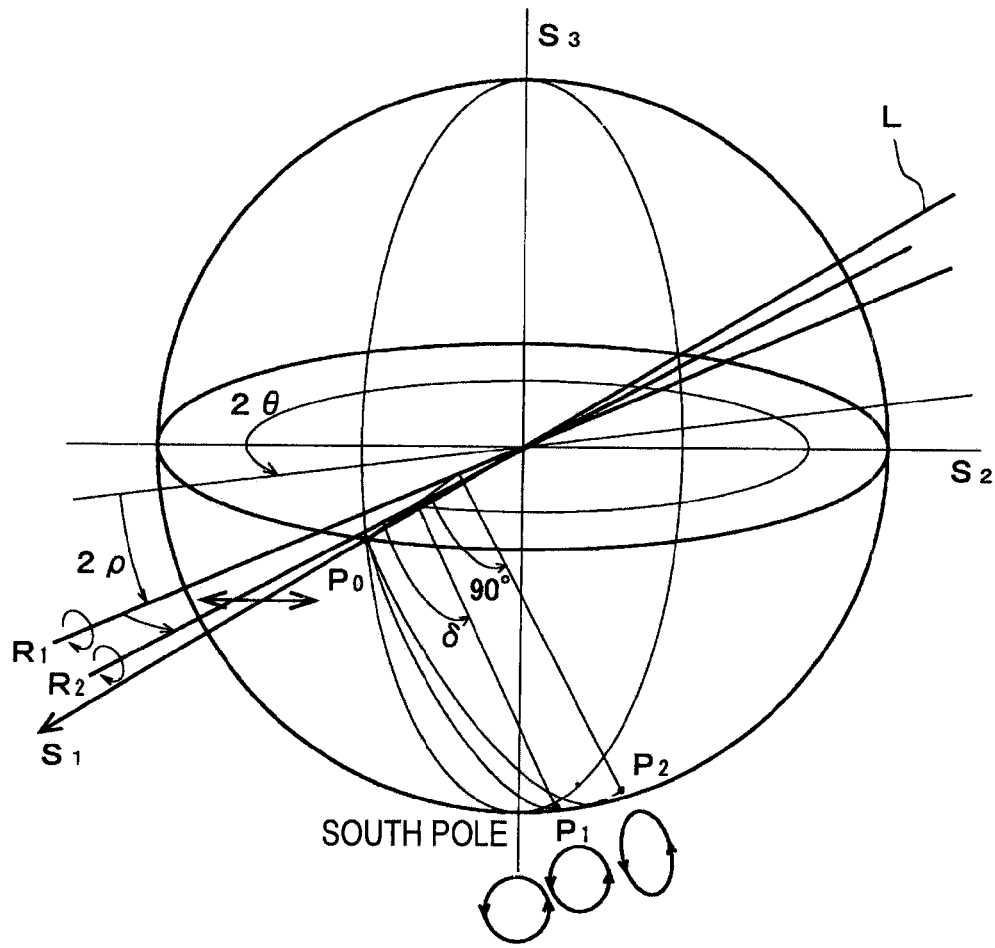

FIGS. 20-1A and 20-1B are diagrams schematically showing a quarter wave plate 31 of a fourth example of the first embodiment. The quarter wave plate 31 of the fourth example is made of left-handed quartz crystal and has left-handed optical rotatory power by which linearly-polarized light of incident light is converted into left-handed circularly-polarized light. In the wave plate 31, an optical axis azimuth angle θ, that is, an angle formed by an optical axis 32 projected on an incident surface 31a and a direction 33 of a polarization plane of the incident linearly-polarized light is set to be larger than a conventional angle of 135°, specifically, in a range of 135°<θ≦165°.

An optimum optical axis azimuth angle θ corresponding to a cutting angle φ is determined by using the following formulas described above.

$$\theta = 135° + a \quad \text{Formula 22}$$

$$a = \sum_{k=1}^{6} A_k \varphi^k$$

Here,
$A_1$=24.3633333343
$A_2$=−6.0380000004
$A_3$=0.6068333334
$A_4$=−0.0303000000
$A_5$=0.0007453333
$A_6$=−0.0000072000

Further, an optimum value of design phase difference Γ of the wave plate 31 is determined in a manner to correspond to a cutting angle φ by using the following formulas described above.

$$\Gamma = 90° - b \quad \text{Formula 23}$$

$$b = \sum_{k=1}^{6} B_k \varphi^k$$

Here,
$B_1$=12.8166666674
$B_2$=−3.5807222225
$B_3$=0.3900833334
$B_4$=−0.0206388889
$B_5$=0.0005300000
$B_6$=−0.0000052889

As shown in FIG. 20-1C, phase difference due to birefringence of quartz crystal and rotation of the polarization plane due to the optical rotatory power act on the linearly polarized light incident from the incident surface 31a of the quarter wave plate 31. However, an optimum optical axis azimuth angle θ and optimum design phase difference Γ are determined based on a cutting angle φ as described above, so that the phase difference δ and the optical axis azimuth angle θ are set at optimum values in the quarter wave plate 31. Therefore, the incident linearly-polarized light is converted into elliptically-polarized light having ellipticity of approximately 1 and is emitted practically as circularly polarized light from the emitting surface 31b.

This optical mechanism is described with reference to a Poincare sphere shown in FIG. 20-2D. A reference point $P_o$ of the incident linearly-polarized light parallel to an S1-S2 plane is set to as $P_o$=(1, 0, 0), a rotation axis $R_1$ is set at a position by being rotated by 2θ from an S1 axis and further, the rotation axis $R_1$ is tilted by an angle of 2ρ (ρ is an optical rotatory angle of the quartz crystal plate) with respect to the S1-S2 plane in the north pole (S3) direction. Further, a rotation axis $R_2$ is set at a position where the rotation axis $R_1$ is rotated so as to be set slightly forward from the S1 axis. The reference point $P_o$ is rotated clockwise around the rotation axis $R_2$ by optimum phase difference δ obtained by adding a compensation amount to common design phase difference of 90°, so as to reach a point $P_2$ which nearly matches the south pole on the sphere. The point $P_2$ is a position from which light is practically emitted, so that the incident linearly-polarized light is converted into the circularly-polarized light and emitted.

As described above, change of a polarization state due to the optical rotatory power of quartz crystal is compensated by setting a combination of an optimum optical axis azimuth angle θ and optimum designing phase difference Γ based on a cutting angle of the quartz crystal plate, being able to set ellipticity of the wave plate 1 to be an optimum value close to 1. Accordingly, the quarter wave plate of the first embodiment not only exerts sufficient light resistance to blue-violet laser but also exhibits high reliability and excellent optical characteristic. The blue-violet laser has a short wavelength, is outputted in high power, and is especially used in an optical pickup device.

Second Embodiment

FIGS. 21A and 21B are diagrams schematically showing a quarter wave plate of a first example of a second embodiment of the invention. A quarter wave plate 41 of the second embodiment is formed by layering two quartz crystal wave plates 41a and 41b having the same cutting angle φ as each other. The quartz crystal wave plates 41a and 41b are arranged such that optical axes 42a and 42b thereof are parallel to each other when viewed from an incident surface 43a (or an emitting surface 43b) as shown in FIG. 21A, and also parallel to each other when viewed from the lateral surface as shown in FIG. 21B.

Phase difference Γ of the quarter wave plate 41 is expressed as the following formula by using Γa and Γb indicating phase differences of the quartz crystal wave plates 41a and 41b. When the quartz crystal wave plates are made of right-handed quartz crystal and have right-handed optical rotatory power or left-handed optical rotatory power, the following relation is derived.

Γ=Γa+Γb=90°+b

When the quartz crystal wave plates are made of left-handed quartz crystal and have right-handed optical rotatory power or left-handed optical rotatory power, the following relation is derived.

Γ=Γa+Γb=90°+b

Here, a compensation amount b of phase difference can be expressed by Formula 24.

$$b = \sum_{k=1}^{6} B_k \varphi^k \quad \text{Formula 24}$$

Here,
$B_1$=12.8166666674
$B_2$=−3.5807222225
$B_3$=0.3900833334
$B_4$=−0.0206388889
$B_5$=0.0005300000
$B_6$=−0.0000052889

Optical axis azimuth angles θ1 and θ2 of the quartz crystal wave plates 41a and 41b are determined as the following formulas as is the case with the first embodiment. In particular, when the quartz crystal wave plates are made of right-handed quartz crystal and have right-handed optical rotatory power, the following formula is derived.

θ1=θ2=45°−a

When the quartz crystal wave plates are made of right-handed quartz crystal and have left-handed optical rotatory power, the following formula is derived.

θ1=θ2=135°−a

When the quartz crystal wave plates are made of left-handed quartz crystal and have right-handed optical rotatory power, the following formula is derived.

θ1=θ2=45°+a

When the quartz crystal wave plates are made of left-handed quartz crystal and have left-handed optical rotatory power, the following formula is derived.

θ1=θ2=135°+a

Here, a compensation amount a of an optical axis azimuth angle can be expressed by Formula 25.

$$a = \sum_{k=1}^{6} A_k \varphi^k \qquad \text{Formula 25}$$

Here,
$A_1$=24.3633333343
$A_2$=−6.0380000004
$A_3$=0.6068333334
$A_4$=−0.0303000000
$A_5$=0.0007453333
$A_6$=−0.0000072000

In the quarter wave plate 41 formed by layering the quartz crystal wave plates 41a and 41b as described above, change of the polarization state due to the optical rotatory power of each of the quartz crystal wave plates is compensated, whereby ellipticity can be set to be an optimum value which is close to 1. Accordingly, the quarter wave plate of the second embodiment not only exerts sufficient light resistance to blue-violet laser but also exhibits high reliability and excellent optical characteristic, as well. The blue-violet laser has a short wavelength, is outputted in high power, and is especially used in an optical pickup device.

FIGS. 22A and 22B are diagrams schematically showing a quarter wave plate of a second example of the second embodiment. This quarter wave plate 51 of the second example is formed by layering two quartz crystal wave plates 51a and 51b having the same cutting angle φ as each other likewise the first example of the second embodiment. The quartz crystal wave plates 51a and 51b are arranged such that optical axes 52a and 52b thereof are parallel to each other when viewed from an incident surface 53a (or an emitting surface 53b) as shown in FIG. 22A, and the optical axes 52a and 52b are symmetrical to bonded surfaces of the wave plates when viewed from the lateral surface as shown in FIG. 22B, but the quartz crystal wave plates 51a and 51b are arranged such that the optical axes are matched each other.

Phase difference Γ of the quarter wave plate 51 is expressed as the following formula by using Γa and Γb indicating phase differences of the quartz crystal wave plates 51a and 51b. When the quartz crystal wave plates are made of right-handed quartz crystal and have right-handed optical rotatory power or left-handed optical rotatory power, the following formula is derived.

Γ=Γa+Γb=90°+b

When the quartz crystal wave plates are made of left-handed quartz crystal and have right-handed optical rotatory power or left-handed optical rotatory power, the following formula is derived.

Γ=Γa+Γb=90°+b

Here, a compensation amount b of phase difference can be expressed by Formula 26, likewise the first example.

$$b = \sum_{k=1}^{6} B_k \varphi^k \qquad \text{Formula 26}$$

Here,
$B_1$=12.8166666674
$B_2$=−3.5807222225
$B_3$=0.3900833334
$B_4$=−0.0206388889
$B_5$=0.0005300000
$B_6$=−0.0000052889

Optical axis azimuth angles θ1 and θ2 of the quartz crystal wave plates 51a and 51b are determined as the following formula as is the case with the first embodiment. In particular, when the quartz crystal wave plates are made of right-handed quartz crystal and have right-handed optical rotatory power, the following formula is derived.

θ1=θ2=45°−a

When the quartz crystal wave plates are made of right-handed quartz crystal and have left-handed optical rotatory power, the following formula is derived.

θ1=θ2=135°−a

When the quartz crystal wave plates are made of left-handed quartz crystal and have right-handed optical rotatory power, the following formula is derived.

θ1=θ2=45°+a

When the quartz crystal wave plates are made of left-handed quartz crystal and have left-handed optical rotatory power, the following formula is derived.

θ1=θ2=135°+a

Here, a compensation amount a of an optical axis azimuth angle can be expressed by Formula 27.

$$a = \sum_{k=1}^{6} A_k \varphi^k \qquad \text{Formula 27}$$

Here,
$A_1$=24.3633333343
$A_2$=−6.0380000004
$A_3$=0.6068333334
$A_4$=−0.0303000000
$A_5$=0.0007453333
$A_6$=−0.0000072000

In the quarter wave plate 51 formed by layering the quartz crystal wave plates 51a and 51b as described above, change of the polarization state due to the optical rotatory power of each of the quartz crystal wave plates is compensated, whereby ellipticity can be set to be an optimum value which is close to 1. Accordingly, the quarter wave plate of the second embodiment also not only exerts sufficient light resistance to blue-violet laser but also exhibits high reliability and excellent optical characteristic. The blue-violet laser has a short wavelength, is outputted in high power, and is especially used in an optical pickup device.

Third Embodiment

Figure 23:
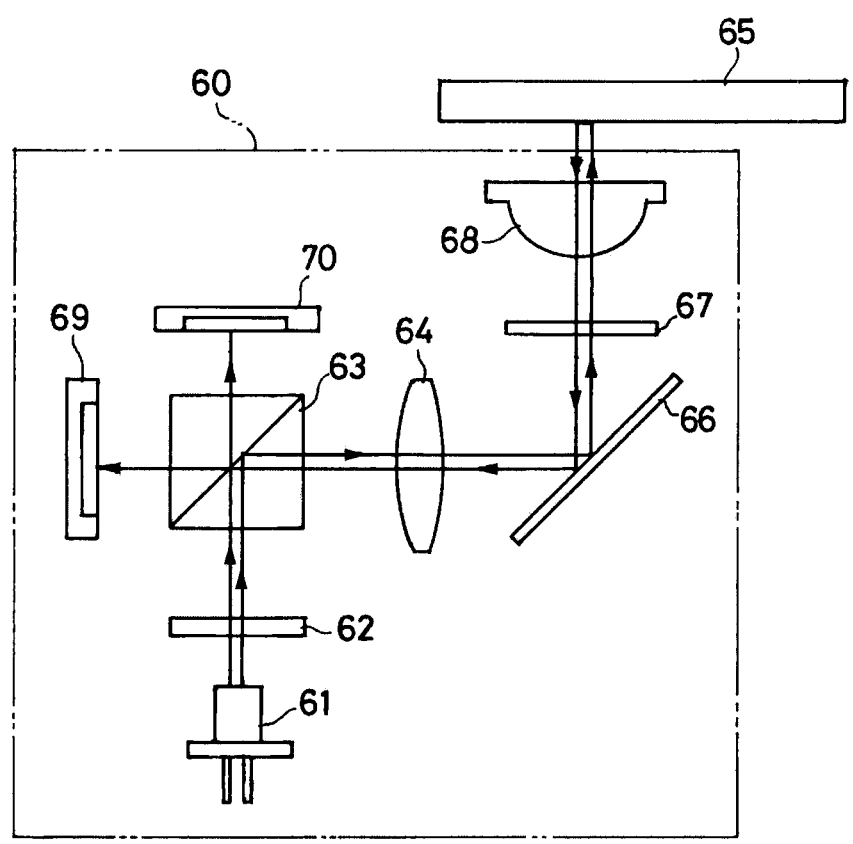
FIG. 23 is a schematic view showing a structure of an optical pickup device, according to a third embodiment, including the quarter wave plate of the invention.

FIG. 23 is a diagram showing an optical pickup device, according to a third embodiment, including the quarter wave plate of the first embodiment. An optical pickup device 60 of the third embodiment is used for record and reproduction of an optical disk device such as Blu-ray (trademark), and includes a light source 61 composed of a laser diode radiating laser light which is blue-violet light having a wavelength of 405 nm, for example. The optical pickup device 60 includes: a diffraction grating 62 diffracting the laser light from the light source 61 so as to branch the laser light into three beams; a polarization beam splitter 63 separating the laser light which has passed the diffraction grating into p-polarized component and s-polarized component and transmitting or reflecting the components; a collimator lens 64 making the laser light reflected by the polarization beam splitter be parallel light; a mirror 66 reflecting the laser light, which has passed through the collimator lens, toward an optical disk 65; a quarter wave plate 67 converting the laser light of linearly-polarized light which has been reflected by the mirror into circularly-polarized light; an objective lens 68 focusing the laser light which has passed through the quarter wave plate; and a light detector 69 detecting the laser light reflected by the optical disk 65. The optical pickup device 60 further includes a monitor light detector 70 detecting the laser light which has been emitted from the light source 61 and has passed through the beam splitter 63.

Operations of the optical pickup device 60 are described below. The laser light of the linearly-polarized light emitted from the light source 61 is separated into three beams by the diffraction grating 62 by tracking control of a three-beam method, and then the s-polarized component is reflected by the polarization beam splitter 63 so as to be parallel light through the collimator lens 64. The laser light of the parallel light is totally reflected by the mirror 66, converted from linearly-polarized light to circularly-polarized light by the quarter wave plate 67, and focused by the objective lens 68 so as to be radiated to a pit of a signal recording layer formed on the optical disk 65. The laser light reflected by the pit passes through the objective lens 68, is converted from the circularly-polarized light into the linearly-polarized light by the quarter wave plate 67, then totally reflected by the mirror 66, passes through the collimator lens 64 and the polarization beam splitter 63, and is incident on the light detector 69 to be detected. Thus a signal recorded in the optical disk is read. The p-polarized component of the laser light emitted from the light source 61 passes through the polarization beam splitter 63 and is incident on the monitor light detector 70 to be detected. By this detection output, an output of the laser light emitted from the laser diode is controlled.

The optical pickup device of the third embodiment includes the quartz crystal quarter wave plate according to the first embodiment as the quarter wave plate 67. Accordingly, the laser light of the linearly-polarized light can be converted into substantive circularly-polarized light of which ellipticity has a high value such as 0.9 or more or approximately 1, being able to realize the optical pickup device suitable for an optical disk device having high recording density.

Fourth Embodiment

Figure 24:
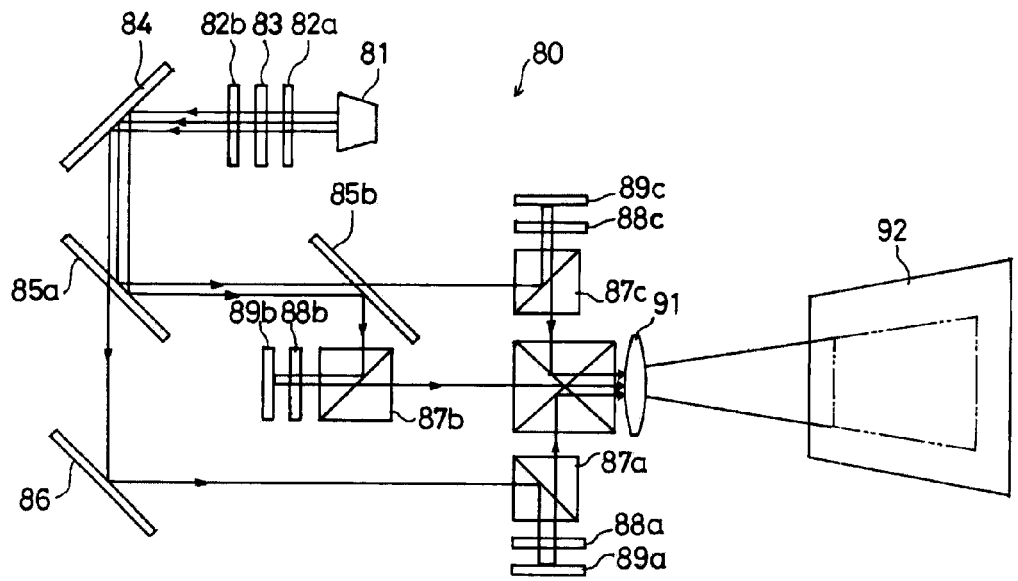
FIG. 24 is a schematic view showing a structure of a LCOS liquid crystal projector including the quarter wave plate of the invention.

FIG. 24 is a diagram showing a liquid crystal on silicon (LCOS) type liquid crystal projector as an example of a reflective liquid crystal display device, according to a first example of a fourth embodiment, including the quarter wave plate of the first embodiment. A liquid crystal projector 80 of the first example includes: a light source 81; first and second integrator lens 82a and 82b; a polarization conversion element 83; a cold mirror 84; first and second dichroic mirrors 85a and 85b constituting a color separation optical system; and a return mirror 86. The projector 80 further includes: polarization beam splitters 87a, 87b, and 87c for red, green, and blue; quarter wave plates 88a, 88b, and 88c for red, green, and blue; reflective liquid crystal display elements 89a, 89b, and 89c for red, green, and blue respectively made of LCOS; a cross prism 90 constituting a color mixing optical system; a projection lens 91; and a screen 92.

Operations of the liquid crystal projector 80 are described below. Random light emitted from the light source 81 becomes parallel light through the first integrator lens 82a, a p-polarized component of the light is converted into s-polarized light by the polarization conversion element 83 and s-polarized light passes through the element 83, then the s-polarized light becomes parallel light through the second integrator lens 82b so as to be incident on the cold mirror 84. Green light and blue light of the light reflected by the cold mirror 84 are reflected by the first dichroic mirror 85a and red light of the same passes through the mirror 85a to be reflected by the return mirror 86. The red light is s-polarized light, so that the red light is reflected at a polarization film of the polarization beam splitter 87a, passes through the quarter wave plate 88a, and then is incident on the reflective liquid crystal display element 89a to be reflected. At this time, the red light is modulated, passes through the quarter wave plate 88a again to be converted into p-polarized light, and passes through the polarization film of the polarization beam splitter 87a to be incident on the cross prism 90.

The green light reflected by the first dichroic mirror 85a is reflected by the second dichroic mirror 85b. The green light is s-polarized light, so that the green light is reflected by a polarization film of the polarization beam splitter 87b, passes through the quarter wave plate 88b, and is incident on the reflective liquid crystal display element 89b to be reflected. At this time, the green light is modulated, passes through the quarter wave plate 88b again to be converted into p-polarized light, and passes through the polarization film of the polarization beam splitter 87b to be incident on the cross prism 90. In a similar manner, the blue light reflected by the first dichroic mirror 85a passes through the second dichroic mirror 85b. The blue light is s-polarized light, so that the blue light is reflected at the polarization beam splitter 87c, passes through the quarter wave plate 88c, and is incident on the reflective liquid crystal display element 89c to be reflected. At this time, the blue light is modulated, passes through the quarter wave plate 88c again to be converted into p-polarized light, and passes through the polarization beam splitter 87c to be incident on the cross prism 90.

The cross prism 90 is structured to reflect incident red light and blue light and transmit green light. Accordingly, the red light, the green light, and the blue light incident on the cross prism 90 are mixed to be projected on the screen 92 through the projection lens 91. Thus a color image is obtained.

The projector of the first example includes the quartz crystal quarter wave plate of the first embodiment as the quarter wave plates 88a, 88b, and 88c respectively for red, green, and blue. Accordingly, the laser light of the linearly-polarized light can be converted into substantive circularly-polarized light of which ellipticity has a high value such as 0.9 or more or approximately 1, being able to realize the reflective liquid crystal display device of which contrast is improved compared to related art.

Figure 25:
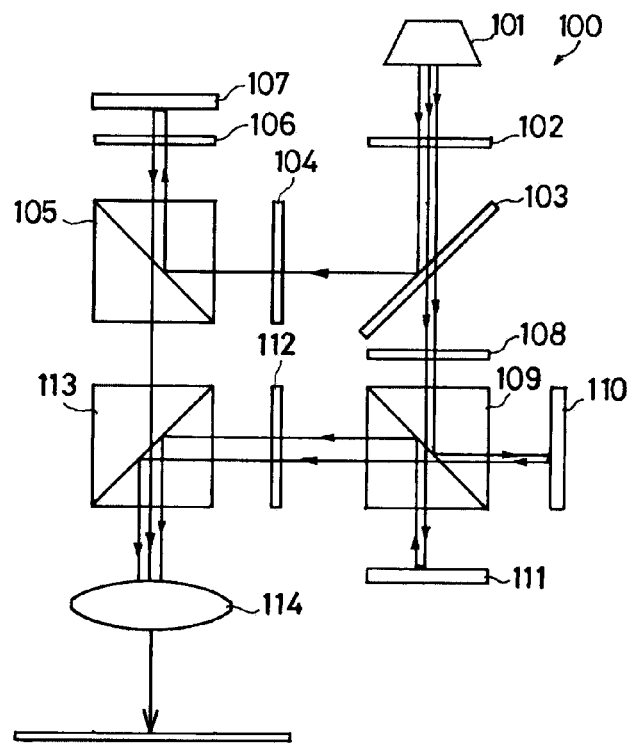
FIG. 25 is a schematic view showing a structure of a reflective liquid crystal display device, according to a fourth embodiment, including the quarter wave plate of the invention.
Figure 26:
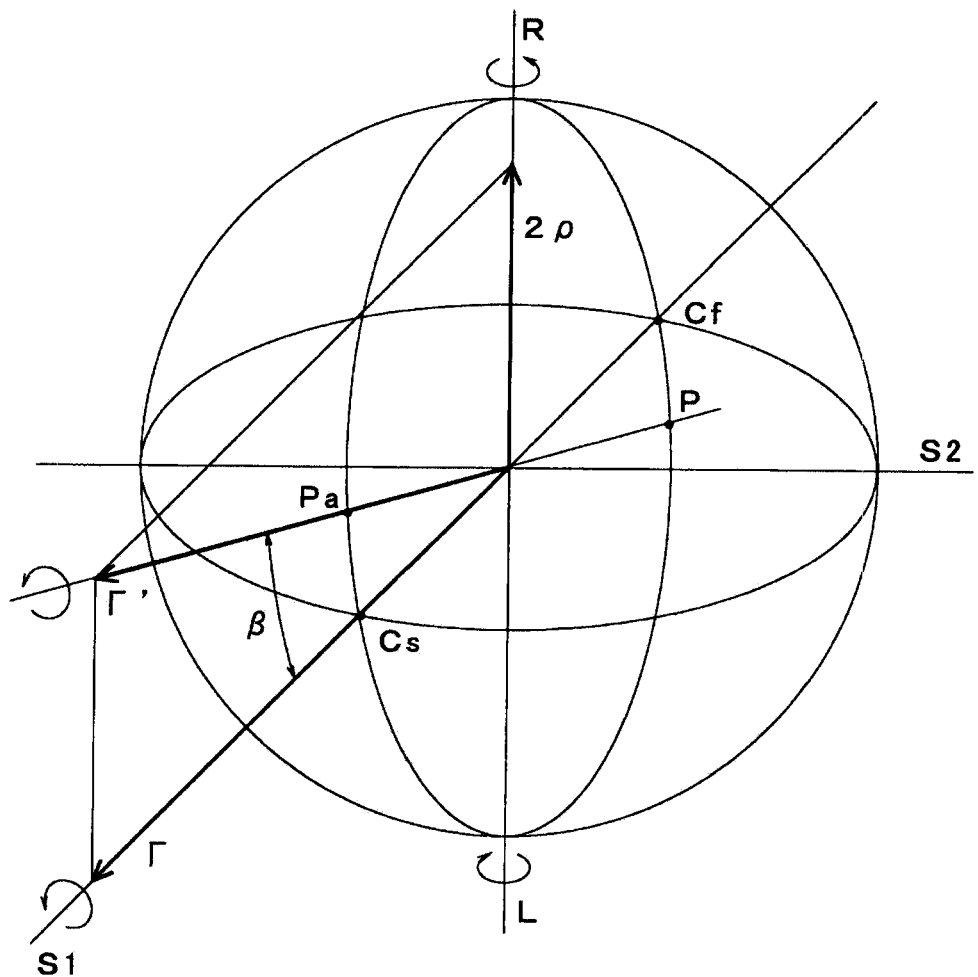
FIG. 26 is a diagram for explaining a polarization state of a related art wave plate by using a Poincare sphere.
Figure 27A:
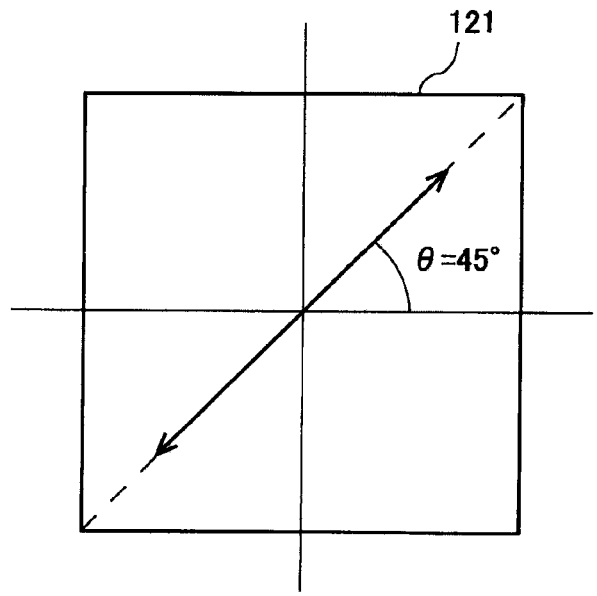
FIG. 27A is an elevation view showing the related art quarter wave plate when viewed from a light emitting direction.
Figure 27B:
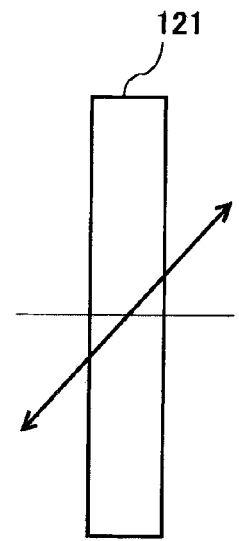
FIG. 27B is a lateral view of the plate.
Figure 27C:
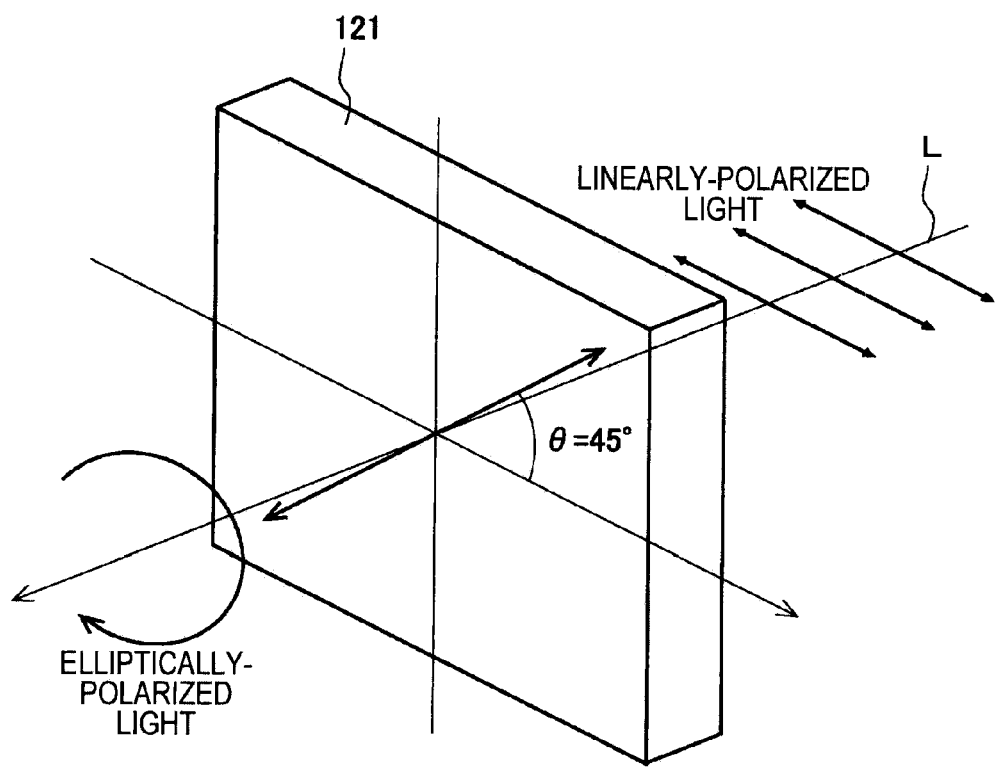
FIG. 27C is a perspective view showing a polarization state of the plate.
Figure 29A:
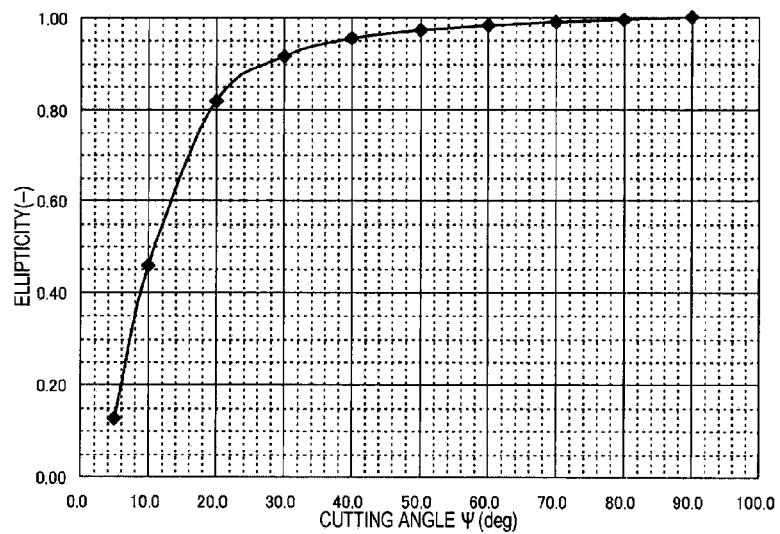
FIGS. 29A, 29B, and 29C are graphs respectively showing ellipticity, phase difference, and thickness of a crystal plate in relation to a cutting angle of the crystal plate.
Figure 29B:
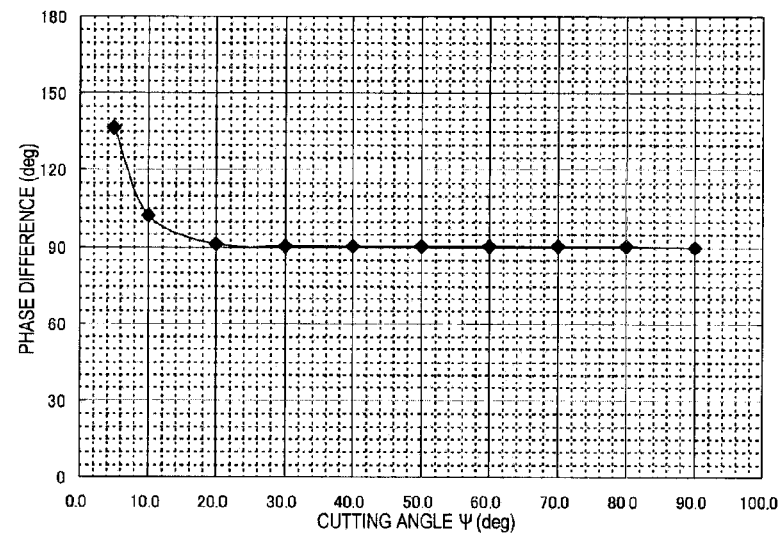
Figure 29C:
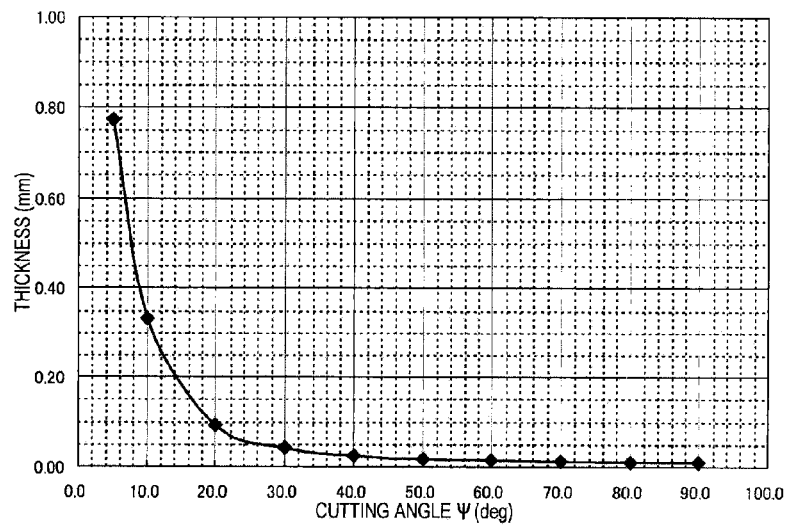
Figure 30:
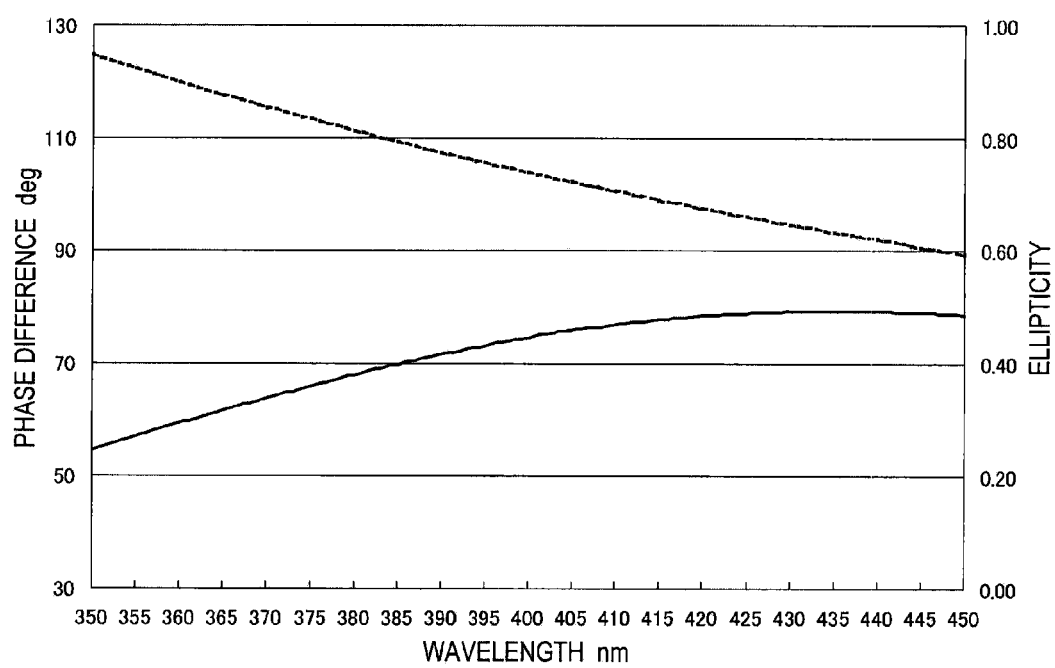
FIG. 30 is a graph showing wavelength dependency of phase difference and that of ellipticity under θ of 45° and phase difference of 90°.
Figure 31:
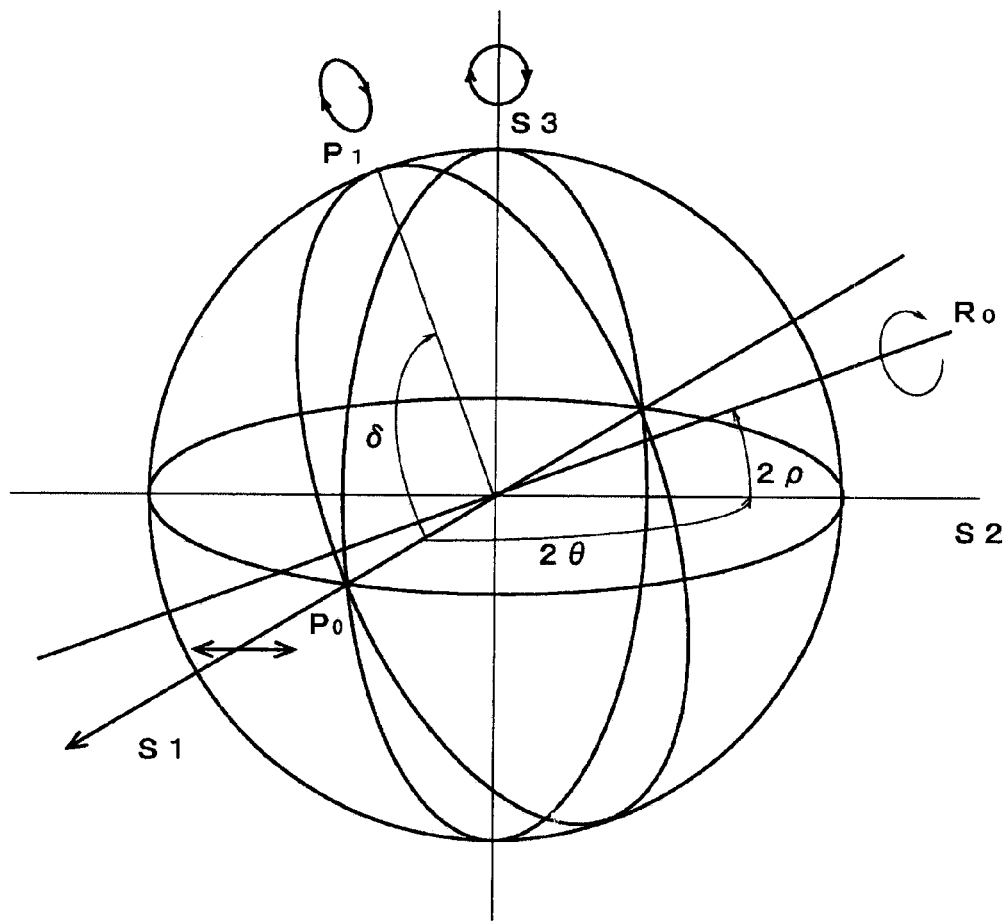
FIG. 31 is a diagram for explaining a polarization state of a wave plate of FIG. 30 by using a Poincare sphere.

FIG. 25 is a diagram showing a second example of a reflective liquid crystal display device including the quarter wave plate of the first embodiment. This reflective liquid crystal display device 100 includes: a light source 101; a polarization conversion element 102; a dichroic mirror 103; a polarization plate 104; a polarization beam splitter 105; a quarter wave plate 106; a reflective liquid crystal display element 107 for green; a polarization rotation element 108; a polarization beam splitter 109; a reflective liquid crystal display element 110 for red; a reflective liquid crystal display element 111 for blue; a polarization rotation element 112; polarization beam splitter 113 constituting a color mixing optical system; and a projection lens 114.

Operations of the reflective liquid crystal display device 100 are described below. After white light emitted from the light source 101 is converted into s-polarized light by the polarization conversion element 102, green light is reflected by the dichroic mirror 103 constituting a color separation optical system and red light and blue light pass through the mirror 103. The green light reflected by the dichroic mirror 103 is the s-polarized light, so that the green light is reflected by a polarization film of the polarization beam splitter 105 and passes the quarter wave plate 106 so as to be incident on the reflective liquid crystal display element 107. The green light incident on the reflective liquid crystal display element 107 is modulated depending on image data. Light contributing to display is reflected as p-polarized light to pass through the quarter wave plate 106 again, and passes through a polarization film of the polarization beam splitter 105 so as to be incident on the polarization beam splitter 113.

Mixed light of the red light and the blue light which have passed through the dichroic mirror 103 is incident on the polarization rotation element 108 so as to be separated into s-polarized red light and p-polarized blue light. The red light is reflected by a polarization film of the polarization beam splitter 109 constituting the color separation optical system, and the blue light passes through the polarization beam splitter 109. Then the red light and the blue light are respectively incident on the reflective liquid crystal display elements 110 and 111. The red light incident on the reflective liquid crystal display element 110 is modulated depending on image data. Light contributing to display is reflected as p-polarized light, and light which does not contribute to display is reflected as s-polarized light as it is. The p-polarized red light passes through a polarization plane of the polarization beam splitter 109, is incident on the polarization rotation element 112 so as to be converted into s-polarized light, and is incident on the polarization beam splitter 113.

Light, contributing to display, of the blue light incident on the reflective liquid crystal display element 111 is reflected as s-polarized light and light which does not contribute to display is reflected as p-polarized light as it is. The s-polarized blue light is reflected by the polarization plane of the polarization beam splitter 109, is incident on the polarization rotation element 112 so as to be converted into s-polarized light, and is incident on the polarization beam splitter 113. The p-polarized green light and the s-polarized red light and the s-polarized blue light which are incident on the polarization beam splitter 113 are mixed and emitted so as to be projected on the screen from the projection lens 114.

The reflective liquid crystal display device of the second example of also includes the quartz crystal quarter wave plate according to the first embodiment as the quarter wave plate 106. Accordingly, the laser light of the linearly-polarized light can be converted into substantive circularly-polarized light of which ellipticity has a high value such as 0.9 or more or approximately 1, being able to realize the reflective liquid crystal display device of which contrast is improved compared to related art.

The invention is not limited to the above embodiments but is applicable to various kinds of modifications and alterations without departing from the technical scope of the invention. For example, the quarter wave plate of the embodiments has a wavelength λ of 405 nm. However, needless to say, the quarter wave plate may have other wavelength. Further, the quarter wave plate of the invention is applicable to other optical pickup devices and other reflective liquid crystal display devices as well as those of the embodiments in a similar manner.

The entire disclosure of Japanese Patent Application No. 2008-276180, filed Oct. 27, 2008 and Japanese Patent Application No. 2009-173236, filed Jul. 24, 2009 is expressly incorporated by reference herein.

What is claimed is:

1. A quarter wave plate that is a crystal plate made of an inorganic material having birefringence and optical rotatory power and has an optical axis, comprising:
   an incident surface positioned on one surface of the crystal plate; and
   an emitting surface positioned on another surface, opposed to the incident surface, of the crystal plate, wherein
   linearly-polarized light incident from the incident surface is converted into circularly-polarized light so as to be emitted from the emitting surface,
   circularly-polarized light incident from the incident surface is converted into linearly-polarized light so as to be emitted from the emitting surface,
   an angle φ formed by a normal line on the incident surface and the optical axis is set in a range of 0°<φ<90°,
   an optical axis azimuth angle θ formed by an optical axis projection line, the optical axis projection line being formed by projecting the optical axis on the incident surface, and a polarization plane of the linearly-polarized light is set in one of a range of 0°<θ<90° under θ≠45° and a range of 90°<θ<180° under θ≠135°, and
   the crystal plate is made of quartz crystal, wherein
      when the quartz crystal is right-handed quartz crystal, the optical axis azimuth angle θ is set as 0°<θ<45° and phase difference Γ due to the birefringence of the quartz crystal is set as Γ>90, and
      when the quartz crystal is left-handed quartz crystal, the optical axis azimuth angle θ is set as 45°<θ<90° and the phase difference Γ due to the birefringence of the quartz crystal is set as Γ<90°.

2. A quarter wave plate that is a crystal plate made of an inorganic material having birefringence and optical rotatory power and has an optical axis, comprising:
   an incident surface positioned on one surface of the crystal plate; and
   an emitting surface positioned on another surface, opposed to the incident surface, of the crystal plate, wherein
   linearly-polarized light incident from the incident surface is converted into circularly-polarized light so as to be emitted from the emitting surface,
   circularly-polarized light incident from the incident surface is converted into linearly-polarized light so as to be emitted from the emitting surface,
   an angle φ formed by a normal line on the incident surface and the optical axis is set in a range of 0°<φ<90°,
   an optical axis azimuth angle θ formed by an optical axis projection line, the optical axis projection line being formed by projecting the optical axis on the incident surface, and a polarization lane of the linearly-polarized light is set in one of a range of 0°<θ<90° under θ≠45° and a range of 90°<θ<180° under θ≠135°, and the crystal plate is made of quartz crystal, wherein
when the quartz crystal is right-handed quartz crystal, the optical axis azimuth angle θ is set as 90°<θ<135° and phase difference Γ due to the birefringence of the quartz crystal is set as Γ>90°, and
when the quartz crystal is left-handed quartz crystal, the optical axis azimuth angle θ is set as 135°<θ<180° and the phase difference Γ due to the birefringence of the quartz crystal is set as Γ<90°.

3. The quarter wave plate according to claim 1, wherein when the optical axis azimuth angle θ is set as θ=45°−a and the phase difference Γ is set as Γ=90°+b in a case where the quartz crystal is right-handed quartz crystal under the angle φ set in a range of 5°<φ≦30°, and when the optical axis azimuth angle θ is set as θ=45°+a and the phase difference Γ is set as Γ=90°−b in a case where the quartz crystal is left-handed quartz crystal under the angle φ set in a range of 5°≦φ≦30°, 1°≦a≦30° and 0°≦b≦12° are satisfied.

4. The quarter wave plate according to claim 2, wherein when the optical axis azimuth angle θ is set as θ=135°−a and the phase difference Γ is set as Γ=90°+b in a case where the quartz crystal is right-handed quartz crystal under the angle φ set in a range of 5°≦φ≦30°, and when the optical axis azimuth angle θ is set as θ=135°+a and the phase difference Γ is set as Γ=90°−b in a case where the quartz crystal is left-handed quartz crystal under the angle φ set in a range of 5°≦φ≦30°, 1°≦a≦30° and 0°≦b≦12° are satisfied.

5. The quarter wave plate according to claim 3, wherein the a and the b respectively satisfy Formula 1 and Formula 2:

$$a = \sum_{k=1}^{6} A_k \varphi^k \quad \text{Formula 1}$$

wherein,
$A_1$=24.3633333343
$A_2$=−6.0380000004
$A_3$=0.6068333334
$A_4$=−0.0303000000
$A_5$=0.0007453333
$A_6$=−0.0000072000

$$b = \sum_{k=1}^{6} B_k \varphi^k \quad \text{Formula 2}$$

wherein,
$B_1$=12.8166666674
$B_2$=−3.5807222225
$B_3$=0.3900833334
$B_4$=−0.0206388889
$B_5$=0.0005300000
$B_6$=−0.0000052889.

6. An optical pickup device, comprising:
a light source;
an objective lens focusing light emitted from the light source on a recording medium;
a detector detecting light reflected by the recording medium; and the quarter wave plate, according to claim 1, disposed on an optical path between the light source and the objective lens.

7. A reflective liquid crystal display device, comprising:
a light source;
a color separation optical system separating light emitted from the light source into a plurality of light having different colors from each other;
a plurality of polarization conversion elements allowing the respective light of different colors received from the color separation optical system to pass therethrough;
a plurality of polarization beam splitters allowing the respective light having passed through the polarization conversion elements to pass therethrough;
a plurality of reflective liquid crystal display elements on which the light respectively having passed through the polarization beam splitters are made incident;
a color mixing optical system mixing the light respectively reflected by the reflective liquid crystal display elements;
a projection lens projecting light, the light being obtained by the mixture of the color mixing optical system, so as to form an image; and
a plurality of quarter wave plates, according to claim 1, disposed on respective optical paths between the reflective liquid crystal display elements and the polarization beam splitters.

8. The quarter wave plate according to claim 4, wherein the a and the b respectively satisfy Formula 1 and Formula 2:

$$a = \sum_{k=1}^{6} A_k \varphi^k \quad \text{Formula 1}$$

wherein,
$A_1$=24.3633333343
$A_2$=−6.0380000004
$A_3$=0.6068333334
$A_4$=−0.0303000000
$A_5$=0.0007453333
$A_6$=−0.0000072000

$$b = \sum_{k=1}^{6} B_k \varphi^k \quad \text{Formula 2}$$

wherein,
$B_1$=12.8166666674
$B_2$=−3.5807222225
$B_3$=0.3900833334
$B_4$=−0.0206388889
$B_5$=0.0005300000
$B_6$=−0.0000052889.

9. An optical pickup device, comprising:
a light source;
an objective lens focusing light emitted from the light source on a recording medium;
a detector detecting light reflected by the recording medium; and the quarter wave plate, according to claim 2, disposed on an optical path between the light source and the objective lens.

10. A reflective liquid crystal display device, comprising:
a light source;
a color separation optical system separating light emitted from the light source into a plurality of light having different colors from each other;

a plurality of polarization conversion elements allowing the respective light of different colors received from the color separation optical system to pass therethrough;
a plurality of polarization beam splitters allowing the respective light having passed through the polarization conversion elements to pass therethrough;
a plurality of reflective liquid crystal display elements on which the light respectively having passed through the polarization beam splitters are made incident;
a color mixing optical system mixing the light respectively reflected by the reflective liquid crystal display elements;
a projection lens projecting light, the light being obtained by the mixture of the color mixing optical system, so as to form an image; and
a plurality of quarter wave plates, according to claim 2, disposed on respective optical paths between the reflective liquid crystal display elements and the polarization beam splitters.

* * * * *